United States Patent
Jia et al.

(10) Patent No.: US 12,384,536 B2
(45) Date of Patent: Aug. 12, 2025

(54) RECONFIGURABLE QUADROTOR WITH CONTROLLED ROLLING AND TURNING

(71) Applicant: CITY UNIVERSITY OF HONG KONG, Hong Kong (HK)

(72) Inventors: Huaiyuan Jia, Shanghai (CN); Pakpong Chirarattananon, Hong Kong (HK); Songnan Bai, Hong Kong (HK); Runze Ding, Hong Kong (HK)

(73) Assignee: CITY UNIVERSITY OF HONG KONG

( * ) Notice: Subject to any disclaimer, the term of this patent is extended or adjusted under 35 U.S.C. 154(b) by 0 days.

(21) Appl. No.: 18/406,061

(22) Filed: Jan. 5, 2024

(65) Prior Publication Data
US 2025/0223035 A1 Jul. 10, 2025

(51) Int. Cl.
*B64C 37/00* (2006.01)
*B64U 10/14* (2023.01)
*B64U 30/293* (2023.01)
*B64U 60/60* (2023.01)
*B64U 101/00* (2023.01)

(52) U.S. Cl.
CPC .............. *B64C 37/00* (2013.01); *B64U 10/14* (2023.01); *B64U 30/293* (2023.01); *B64U 60/60* (2023.01); *B64U 2101/00* (2023.01)

(58) Field of Classification Search
CPC ...... B64U 10/14; B64U 30/293; B64U 60/60; B64U 2101/00; B64C 37/00; B64C 25/36; B64C 39/02
See application file for complete search history.

(56) References Cited

U.S. PATENT DOCUMENTS

| 9,061,558 B2 * | 6/2015 | Kalantari ............. A63H 33/005 |
| 9,145,207 B2 * | 9/2015 | Moschetta ............. B64C 25/36 |
| 9,150,069 B2 | 10/2015 | Kalantari et al. |

(Continued)

FOREIGN PATENT DOCUMENTS

| CN | 108706101 B | * | 7/2019 | ............. B64C 19/02 |
| JP | 2015117003 A | * | 6/2015 | ............. B64C 37/00 |
| JP | 2016026946 A | * | 2/2016 | ............. B64C 37/00 |

OTHER PUBLICATIONS

Tan et al., "A one-step visual-inertial ego-motion estimation using photometric feedback," IEEE/ASME Transactions on Mechatronics, vol. 27, No. 1, pp. 12-23, 2022.

(Continued)

*Primary Examiner* — Benjamin P Lee
(74) *Attorney, Agent, or Firm* — Merchant & Gould P.C.

(57) ABSTRACT

A quadrotor is proposed than can both fly and roll. The proposed robot employs passively reconfigurable structures to enable the rolling, tightly coupling the attitude of the robot to the rolling cage. The benefits are precise rolling and turning control as well as improved rolling efficiency. The passively reconfigurable structures are enabled by pre-stretched elastic springs to generate a nonlinear restoring torque. The robot leveraged the superior maneuverability in the rolling mode to take photos of the surroundings at different tilting and panning angles to construct a panoramic image. Besides, the results of the power measurements show a significant reduction in the cost of transport brought by at low speed, equating to a 15-fold extension in the operational range.

14 Claims, 26 Drawing Sheets

(56) References Cited

U.S. PATENT DOCUMENTS

| | | | | |
|---|---|---|---|---|
| 9,364,766 | B2* | 6/2016 | Mielniczek | A63H 33/003 |
| 9,550,400 | B2* | 1/2017 | Hutson | A63H 17/14 |
| 10,384,772 | B2* | 8/2019 | Yamada | B64D 1/22 |
| D867,207 | S * | 11/2019 | O'Brien | D12/16.1 |
| 10,759,531 | B2* | 9/2020 | Yamada | B64C 25/54 |
| 11,338,634 | B1* | 5/2022 | Lacaze | B60F 5/02 |
| 11,597,513 | B2* | 3/2023 | Liu | B64U 10/13 |
| 11,649,048 | B2* | 5/2023 | Hada | B64U 30/20 244/17.23 |
| 11,661,188 | B2* | 5/2023 | Briod | B64U 30/299 244/17.23 |
| 11,673,663 | B2* | 6/2023 | Benedict | B64D 27/24 244/17.23 |
| 11,708,160 | B2* | 7/2023 | Briod | B64U 50/30 244/17.23 |
| 11,999,475 | B2* | 6/2024 | Ma | B64U 30/293 |
| D1,041,576 | S * | 9/2024 | Xiao | D21/468 |
| 12,091,163 | B2* | 9/2024 | Johannesson | B64C 39/024 |
| 12,091,171 | B2* | 9/2024 | Arnold | B64C 1/08 |
| 12,134,488 | B2* | 11/2024 | Sidoti | B64U 50/19 |
| 2014/0061362 | A1* | 3/2014 | Olm | B60B 1/00 244/2 |
| 2014/0131507 | A1* | 5/2014 | Kalantari | B60F 5/02 244/2 |
| 2016/0009381 | A1* | 1/2016 | Benatar | B64U 60/60 244/131 |
| 2016/0176514 | A1* | 6/2016 | Lavagen | B64C 25/54 244/50 |
| 2017/0029103 | A1* | 2/2017 | Chang | B64U 30/299 |
| 2017/0274995 | A1* | 9/2017 | Yamada | B64C 23/005 |
| 2018/0002035 | A1* | 1/2018 | Neely | H04N 13/204 |
| 2019/0322362 | A1* | 10/2019 | Santangelo | B64C 25/58 |
| 2019/0329884 | A1* | 10/2019 | Hada | G05D 1/0866 |
| 2020/0307783 | A1* | 10/2020 | Lacaze | B64U 30/299 |
| 2021/0061463 | A1* | 3/2021 | Briod | B60L 50/60 |
| 2021/0114730 | A1* | 4/2021 | MacDonald | F16C 19/10 |
| 2021/0339845 | A1* | 11/2021 | Milan | B64U 20/30 |
| 2022/0126627 | A1* | 4/2022 | Sheffield | B64U 20/50 |
| 2022/0380044 | A1* | 12/2022 | Arnold | B64U 20/30 |
| 2023/0150660 | A1* | 5/2023 | Ramezani | B64U 60/60 244/2 |

OTHER PUBLICATIONS

Campos et al., "Orb-slam3: An accurate open-source library for visual, visual-inertial, and multimap slam," IEEE Transactions on Robotics, vol. 37, No. 6, pp. 1874-1890, 2021.
Zhou et al., "Swarm of micro flying robots in the wild," Science Robotics, vol. 7, No. 66, p. eabm5954, 2022.
Shah et al., "Multidrone aerial surveys of penguin colonies in antarctica," Science Robotics, vol. 5, No. 47, p. eabc3000, 2020.
Tabib et al., "Autonomous cave surveying with an aerial robot," IEEE Transactions on Robotics, vol. 38, No. 2, pp. 1016-1032, 2022.
Hua et al., "A new nonlinear control strategy embedded with reinforcement learning for a multirotor transporting a suspended payload," IEEE/ASME Transactions on Mechatronics, 2021.
Bauersfeld et al., "Range, endurance, and optimal speed estimates for multicopters," IEEE Robotics and Automation Letters, vol. 7, No. 2, pp. 2953-2960, 2022.
Karydis et al., "Energetics in robotic flight at small scales," Interface focus, vol. 7, No. 1, p. 20160088, 2017.
Bai et al., "A bioinspired revolving-wing drone with passive attitude stability and efficient hovering flight," Science Robotics, vol. 7, No. 66, p. eabg5913, 2022.
Graule et al., "Perching and takeoff of a robotic insect on overhangs using switchable electrostatic adhesion," Science, vol. 352, No. 6288, pp. 978-982, 2016.
Hsiao et al., "Ceiling effects for hybrid aerial-surface locomotion of small rotorcraft," IEEE/ASME Transactions on Mechatronics, vol. 24, No. 5, pp. 2316-2327, 2019.
Park et al., "Lightweight high voltage generator for untethered electroadhesive perching of micro air vehicles," IEEE Robotics and Automation Letters, vol. 5, No. 3, pp. 4485-4492, 2020.
Nguyen et al., "A passively adaptive microspine grapple for robust, controllable perching," in 2019 2nd IEEE International Conference on Soft Robotics (RoboSoft). IEEE, 2019, pp. 80-87.
Kirchgeorg et al., "Hedgehog: Drone perching on tree branches with high-friction origami spines," IEEE Robotics and Automation Letters, vol. 7, No. 1, pp. 602-609, 2021.
Pratt et al., "Dynamic underactuated flying-walking (DUCK) robot," in 2016 IEEE International Conference on Robotics and Automation (ICRA). IEEE, 2016, pp. 3267-3274.
Ratsamee et al., "A hybrid flying and walking robot for steel bridge inspection," in 2016 IEEE International Symposium on Safety, Security, and Rescue Robotics (SSRR). IEEE, 2016, pp. 62-67.
Mulgaonkar et al., "The flying monkey: A mesoscale robot that can run, fly, and grasp," in 2016 IEEE International Conference on Robotics and Automation (ICRA). IEEE, 2016, pp. 4672-4679.
Kim et al., "A bipedal walking robot that can fly, slackline, and skateboard," Science Robotics, vol. 6, No. 59, p. eabf8136, 2021.
Kossett et al., "More than meets the eye: A hybrid-locomotion robot with rotary flight and wheel modes," in 2009 IEEE/RSJ International Conference on Intelligent Robots and Systems, 2009, pp. 5653-5658.
Parrot Minidrones Rolling Spider User Guide, Parrot FA.
Kalantari et al., "Modeling and performance assessment of the hytaq, a hybrid terrestrial/aerial quadrotor," IEEE Transactions on Robotics, vol. 30, No. 5, pp. 1278-1285, 2014.
Zhang et al., "Autonomous and adaptive navigation for terrestrial-aerial bimodal vehicles," IEEE Robotics and Automation Letters, vol. 7, No. 2, pp. 3008-3015, 2022.
Kawasaki et al., "Muwa: Multi-field universal wheel for air-land vehicle with quad variable-pitch propellers," in 2013 IEEE/RSJ International Conference on Intelligent Robots and Systems. IEEE, 2013, pp. 1880-1885.
Jia et al., "A quadrotor with a passively reconfigurable airframe for hybrid terrestrial locomotion," IEEE/ASME Transactions on Mechatronics, vol. 27, No. 6, pp. 4741-4751, 2022.
Gefen et al., "Flying star2, a hybrid flying driving robot with a clutch mechanism and energy optimization algorithm," IEEE Access, vol. 10, pp. 115 491-115 502, 2022.
Atay et al., "Energetic analysis and optimization of a bi-modal rolling-flying vehicle," International Journal of Intelligent Robotics and Applications, vol. 4, No. 1, pp. 3-20, 2020.
Bai et al., "A micro aircraft with passive variable-sweep wings," IEEE Robotics and Automation Letters, vol. 7, No. 2, pp. 4016-4023, 2022.
Bucki et al., "Design and control of a midair-reconfigurable quadcopter using unactuated hinges," IEEE Transactions on Robotics, vol. 39, No. 1, pp. 539-557, 2023.
Patnaik et al., "Design and Control of SQUEEZE: A Spring-augmented QUadrotor for interactions with the Environment to squeeZE-and-fly," in 2020 IEEE/RSJ International Conference on Intelligent Robots and Systems (IROS). IEEE, 2020, pp. 1364-1370.
Li et al., "Aerial-aquatic robots capable of crossing the air-water boundary and hitchhiking on surfaces," Science Robotics, vol. 7, No. 66, p.eabm6695, 2022.
Fabris et al., "Crash 2 Squash: An Autonomous Drone for the Traversal of Narrow Passageways," Advanced Intelligent Systems, vol. 4, No. 11, p. 2200113,2022.
Brown et al., "Automatic panoramic image stitching using invariant features," International Journal of Computer Vision, vol. 74, pp. 59-73, 2007.

* cited by examiner

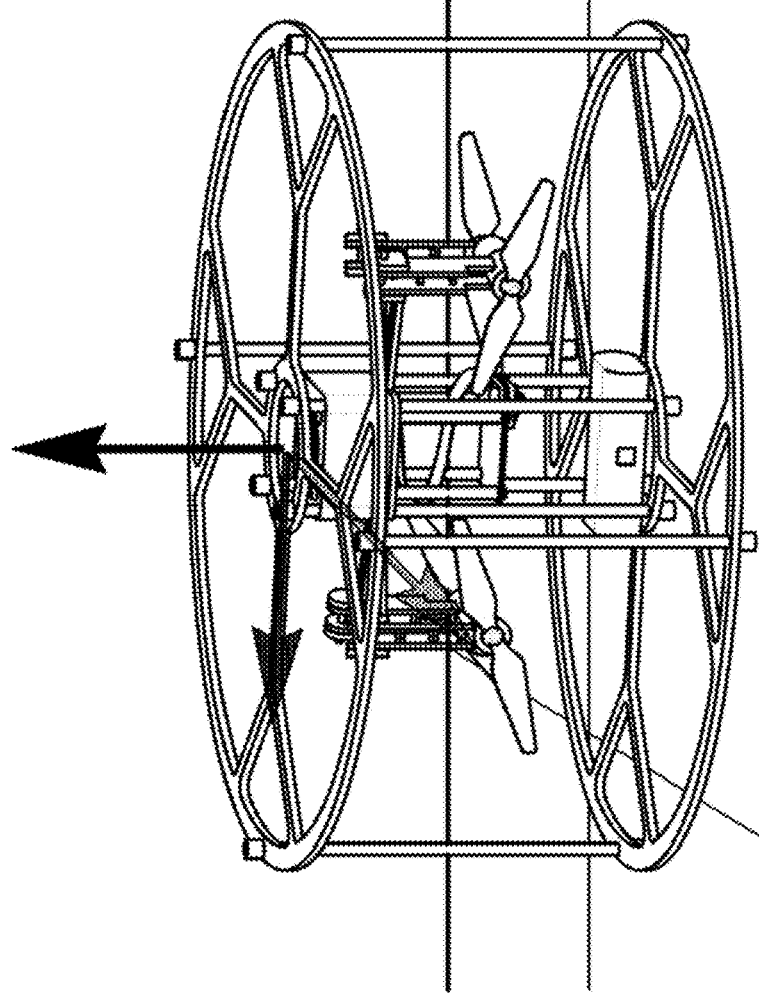
Fig. 8a  t = 0 s t = 2 s

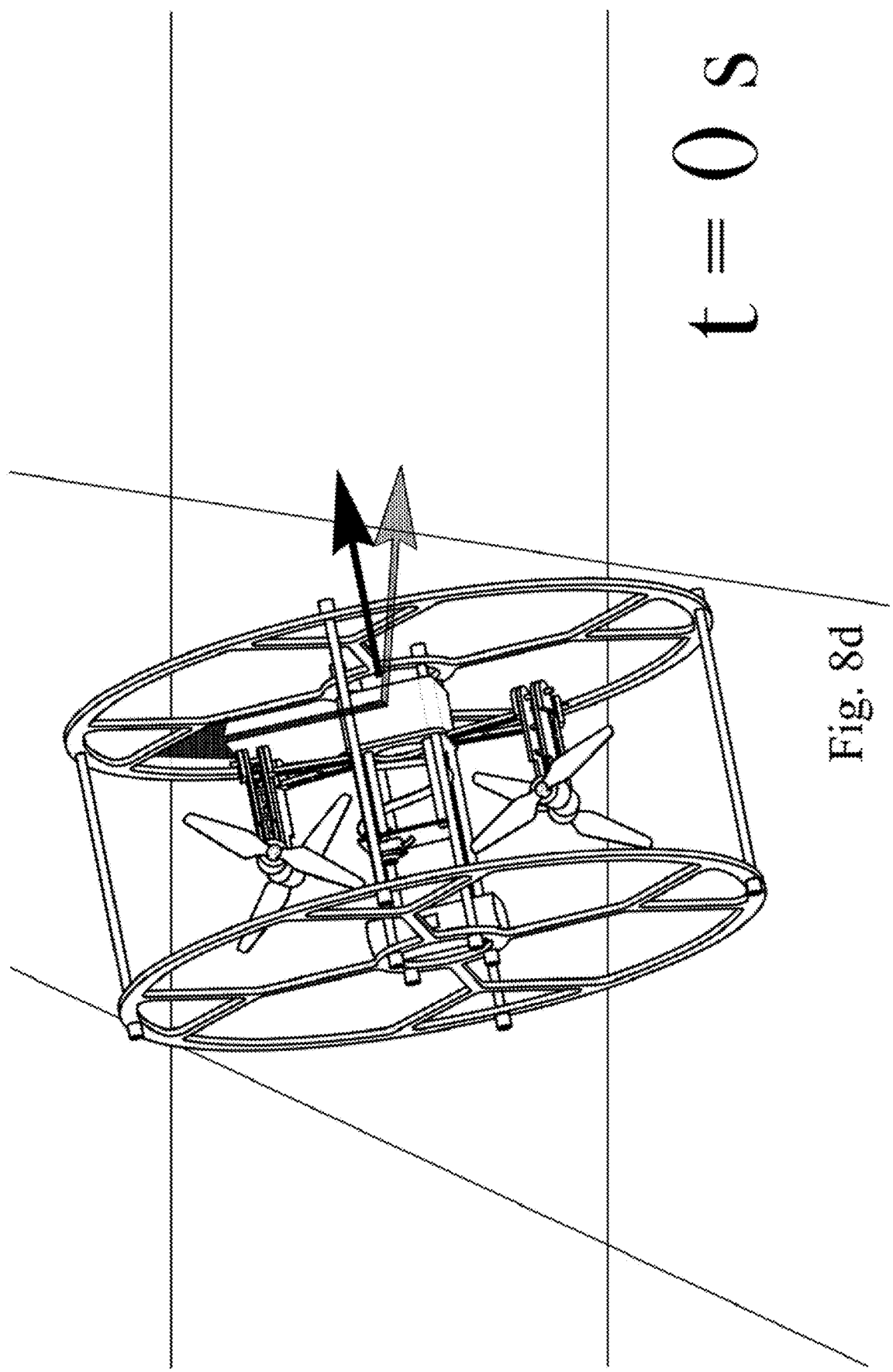
Fig. 8d  t = 0 s $t = 0\,s$

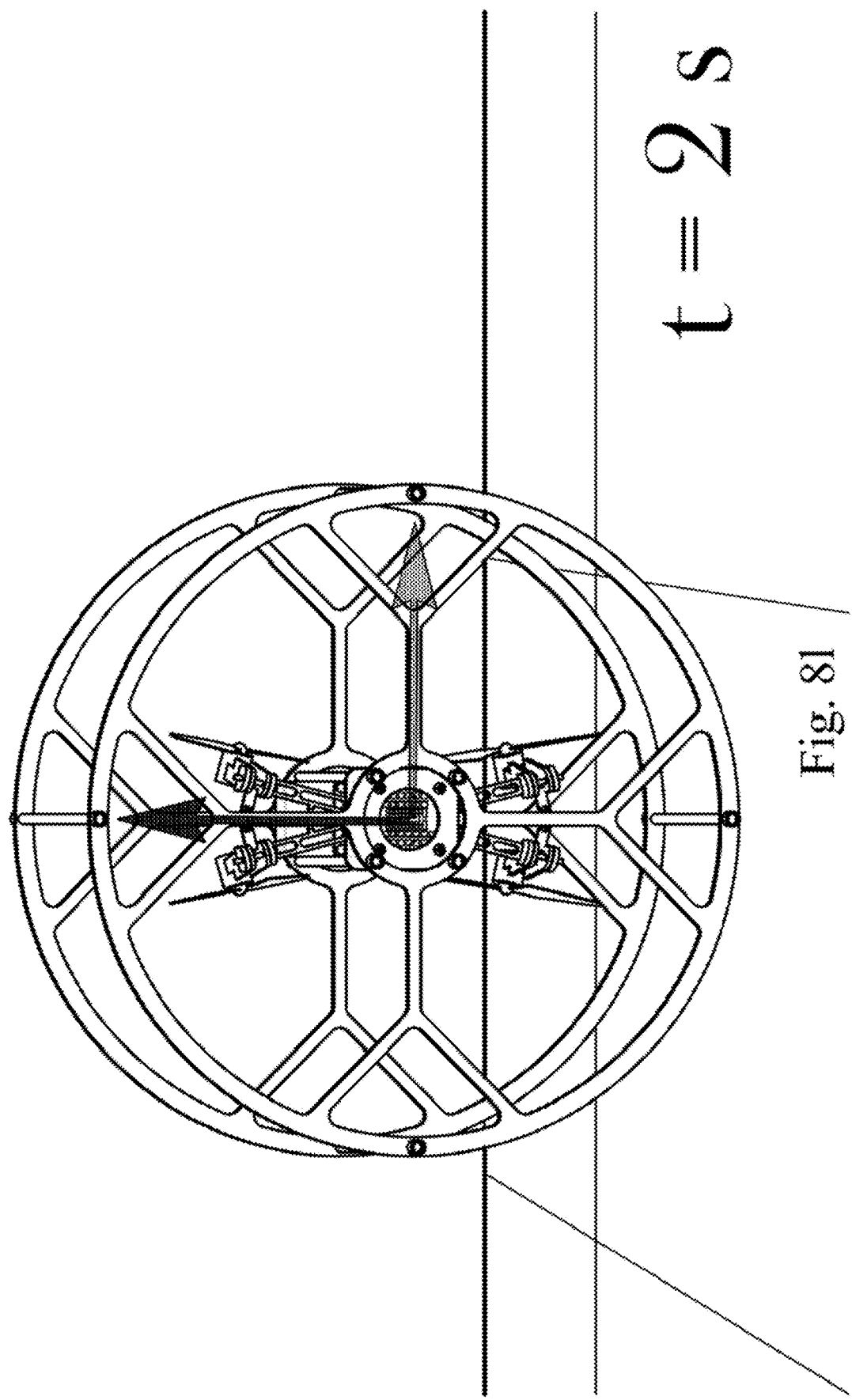
Fig. 81  t = 2 s

RECONFIGURABLE QUADROTOR WITH CONTROLLED ROLLING AND TURNING

FIELD OF INVENTION

This invention relates to unmanned aerial vehicles (UAVs), and in particular to UAVs that are capable of flying in midair as well as rolling on a surface.

BACKGROUND OF INVENTION

Advances in autonomous navigation [1]-[3] have led to the deployment of Micro Aerial Vehicles (MAVs), which are types of UAVs, for a range of applications such as surveying [4], [5] and aerial transport [6]. However, the increasingly complex tasks and environments demand the robots to carry more payload and travel further. This is inevitably impeded by the high-power requirement of flight. The issue aggravates with the relatively poor efficiency of rotorcrafts [7], especially for smaller vehicles [8], [9]. The range and endurance rapidly become limiting factors, hindering these robots from wider uses.

Several avenues have been explored to raise the range and endurance of MAVs, depending on different operational needs. For tasks that demand a prolonged stay at elevation but involve minimal traveling (e.g., hovering), an alternative vehicle design with large rotating wings has been shown to halve the power consumption [9]. Similarly, hybrid aerial-surface locomotion or perching allows the robots to monitor the surroundings with lowered power consumption as they actively [10]-[12] or passively [13], grasp [13], adhere to [10], [12], or rest/lean on [11], nearby structures.

Alternatively, for missions entailing distant journeys, the bimodal aerial and terrestrial locomotion has emerged as a workaround solution to permit robots to fly over obstacles and traverse on ground to conserve energy. The ground phase is usually realized via either legged [15]-[18] or wheeled [19]-locomotion. The walking or crawling motion benefits from the ability to deal with rough terrains, at the cost of sophisticated linkages [15], or additional actuators [16], [18]. Despite this, crawling results in a 2.5-fold decrease in the cost of transport (COT) of the 30-gram hybrid quadrotor in [17], implying a substantial improvement in the operating range. Unsurprisingly, wheeled quadrotors have been shown to reduce the COT by up to a factor of 10 [21], [22], [26] when they roll at relatively low speeds.

PRIOR ART

The following references are referred to throughout this specification, as indicated by the numbered brackets:

[1] S. Tan, S. Zhong, and P. Chirarattananon, "A one-step visual-inertial ego-motion estimation using photometric feedback," IEEE/ASME Transactions on Mechatronics, vol. 27, no. 1, pp. 12-23, 2022.

[2] C. Campos, R. Elvira, J. J. G. Rodriguez, J. M. Montiel, and J. D. Tardos, "Orb-slam3: An accurate open-source library for visual, visual-inertial, and multimap slam," IEEE Transactions on Robotics, vol. 37, no. 6, pp. 1874-1890, 2021.

[3] X. Zhou, X. Wen, Z. Wang, Y. Gao, H. Li, Q. Wang, T. Yang, H. Lu, Y. Cao, C. Xu et al., "Swarm of micro flying robots in the wild," Science Robotics, vol. 7, no. 66, p. eabm5954, 2022.

[4] K. Shah, G. Ballard, A. Schmidt, and M. Schwager, "Multidrone aerial surveys of penguin colonies in antarctica," Science Robotics, vol. 5, no. 47, p. eabc3000, 2020.

[5] W. Tabib, K. Goel, J. Yao, C. Boirum, and N. Michael, "Autonomous cave surveying with an aerial robot," IEEE Transactions on Robotics, vol. 38, no. 2, pp. 1016-1032, 2022.

[6] H. Hua, Y. Fang, X. Zhang, and C. Qian, "A new nonlinear control strategy embedded with reinforcement learning for a multirotor transporting a suspended payload," IEEE/ASME Transactions on Mechatronics, 2021.

[7] L. Bauersfeld and D. Scaramuzza, "Range, endurance, and optimal speed estimates for multicopters," IEEE Robotics and Automation Letters, vol. 7, no. 2, pp. 2953-2960, 2022.

[8] K. Karydis and V. Kumar, "Energetics in robotic flight at small scales," Interface focus, vol. 7, no. 1, p. 20160088, 2017.

[9] S. Bai, Q. He, and P. Chirarattananon, "A bioinspired revolving-wing drone with passive attitude stability and efficient hovering flight," Science Robotics, vol. 7, no. 66, p. eabg5913, 2022.

[10] M. A. Graule, P. Chirarattananon, S. B. Fuller, N. T. Jafferis, K. Y. Ma, M. Spenko, R. Kornbluh, and R. J. Wood, "Perching and takeoff of a robotic insect on overhangs using switchable electrostatic adhesion," Science, vol. 352, no. 6288, pp. 978-982, 2016.

[11] Y. H. Hsiao and P. Chirarattananon, "Ceiling effects for hybrid aerial-surface locomotion of small rotorcraft," IEEE/ASME Transactions on Mechatronics, vol. 24, no. 5, pp. 2316-2327, 2019.

[12] S. Park, D. S. Drew, S. Follmer, and J. Rivas-Davila, "Lightweight high voltage generator for untethered electroadhesive perching of micro air vehicles," IEEE Robotics and Automation Letters, vol. 5, no. 3, pp. 4485-4492, 2020.

[13] H. N. Nguyen, R. Siddall, B. Stephens, A. Navarro-Rubio, and M. Kovač, "A passively adaptive microspine grapple for robust, controllable perching," in 2019 2nd IEEE International Conference on Soft Robotics (RoboSoft). IEEE, 2019, pp. 80-87.

[14] S. Kirchgeorg and S. Mintchev, "Hedgehog: Drone perching on tree branches with high-friction origami spines," IEEE Robotics and Automation Letters, vol. 7, no. 1, pp. 602-609, 2021.

[15] C. J. Pratt and K. K. Leang, "Dynamic underactuated flying-walking (duck) robot," in 2016 IEEE International Conference on Robotics and Automation (ICRA). IEEE, 2016, pp. 3267-3274.

[16] P. Ratsamee, P. Kriengkomol, T. Arai, K. Kamiyama, Y. Mae, K. Kiyokawa, T. Mashita, Y. Uranishi, and H. Takemura, "A hybrid flying and walking robot for steel bridge inspection," in 2016 IEEE International Symposium on Safety, Security, and Rescue Robotics (SSRR). IEEE, 2016, pp. 62-67.

[17] Y. Mulgaonkar, B. Araki, J. s. Koh, L. Guerrero-Bonilla, D. M. Aukes, A. Makineni, M. T. Tolley, D. Rus, R. J. Wood, and V. Kumar, "The flying monkey: A mesoscale robot that can run, fly, and grasp," in 2016 IEEE international conference on robotics and automation (ICRA). IEEE, 2016, pp. 4672-4679.

[18] K. Kim, P. Spieler, E. S. Lupu, A. Ramezani, and S. J. Chung, "A bipedal walking robot that can fly, slackline, and skateboard," Science Robotics, vol. 6, no. 59, p. eabf8136, 2021.

[19] A. Kossett, J. Purvey, and N. Papanikolopoulos, "More than meets the eye: A hybrid-locomotion robot with rotary flight and wheel modes," in 2009 IEEE/RSJ International Conference on Intelligent Robots and Systems, 2009, pp. 5653-5658.

[20] P. SA, Parrot Minidrones Rolling Spider User Guide, Parrot FA.

[21] A. Kalantari and M. Spenko, "Modeling and performance assessment of the hytaq, a hybrid terrestrial/aerial quadrotor," IEEE Transactions on Robotics, vol. 30, no. 5, pp. 1278-1285, 2014.

[22] R. Zhang, Y. Wu, L. Zhang, C. Xu, and F. Gao, "Autonomous and adaptive navigation for terrestrial-aerial bimodal vehicles," IEEE Robotics and Automation Letters, vol. 7, no. 2, pp. 3008-3015, 2022.

[23] K. Kawasaki, M. Zhao, K. Okada, and M. Inaba, "Muwa: Multi-field universal wheel for air-land vehicle with quad variable-pitch propellers," in 2013 IEEE/RSJ International Conference on Intelligent Robots and Systems. IEEE, 2013, pp. 1880-1885.

[24] H. Jia, S. Bai, R. Ding, J. Shu, Y. Deng, B. L. Khoo, and P. Chirarattananon, "A quadrotor with a passively reconfigurable airframe for hybrid terrestrial locomotion," IEEE/ASME Transactions on Mechatronics, vol. 27, no. 6, pp. 4741-4751, 2022.

[25] E. Gefen and D. Zarrouk, "Flying star2, a hybrid flying driving robot with a clutch mechanism and energy optimization algorithm," IEEE Access, vol. 10, pp. 115 491-115 502, 2022.

[26] S. Atay, T. Jenkins, G. Buckner, and M. Bryant, "Energetic analysis and optimization of a bi-modal rolling-flying vehicle," International Journal of Intelligent Robotics and Applications, vol. 4, no. 1, pp. 3-20, 2020.

[27] S. Bai, R. Ding, and P. Chirarattananon, "A micro aircraft with passive variable-sweep wings," IEEE Robotics and Automation Letters, vol. 7, no. 2, pp. 4016-4023, 2022.

[28] N. Bucki, J. Tang, and M. W. Mueller, "design and control of a midair-reconfigurable quadcopter using unactuated hinges," IEEE Transactions on Robotics, vol. 39, no. 1, pp. 539-557, 2023.

[29] K. Patnaik and S. Mishra and S. M. R. Sorkhabadi and W. Zhang, "Design and Control of SQUEEZE: A Spring-augmented QUadrotor for intEractions with the Environment to squeeZE-and-fly," in 2020 IEEE/RSJ International Conference on Intelligent Robots and Systems (IROS). IEEE, 2020, pp. 1364-1370.

[30] L. Li and S. Wang and Y. Zhang and S. Song and C. Wang and S. Tan and W. Zhao and G. Wang and W. Sun and F. Yang and others, "Aerial-aquatic robots capable of crossing the air-water boundary and hitchhiking on surfaces," Science Robotics, vol. 7, no. 66, p. eabm6695, 2022.

[31] A. Fabris and E. Aucone and S. Mintchev, "Crash 2 Squash: An Autonomous Drone for the Traversal of Narrow Passageways," Advanced Intelligent Systems, vol. 4, no. 11, p. 2200113, 2022.

[32] M. Brown and D. G. Lowe, "Automatic panoramic image stitching using invariant features," International journal of computer vision, vol. 74, pp. 59-73, 2007.

SUMMARY OF INVENTION

Accordingly, the present invention, in one aspect, is an unmanned aerial vehicle, which includes a rolling structure adapted to roll on a surface; a body mounted within the rolling structure; and one or more propellers connected to the body. The body is coupled to the one or more propellers by a passively reconfigurable module, such that the unmanned aerial vehicle is adapted to be switched between a flying state and a rolling state.

In some embodiments, the body is connected non-rotatably to the rolling structure.

In some embodiments, the rolling structure contains two wheels. The wheels are connected respectively to two opposite ends of the body.

In some embodiments, the unmanned aerial vehicle contains four propellers. The passively reconfigurable module contains four passively reconfigurable joints. Each passively reconfigurable joint connects a respective one of the four propellers to the body.

In some embodiments, each passively reconfigurable joint includes a propeller arm pivotally coupled to the body at a revolute point, and an elastic component with one end connected to or adjacent a free end of the propeller arm, and another end coupled to the body at a location away from the revolute point.

In some embodiments, the elastic component is a coil spring which is pre-stretched, such that the unmanned aerial vehicle is in the rolling state when the propellers are not energized.

In some embodiments, the coil spring is substantially parallel to the propeller arm when the unmanned aerial vehicle is in the flying state.

In some embodiments, the coil spring and the propeller arm form two sides of a virtual triangle when the unmanned aerial vehicle is in the rolling state. The revolute point is located at a vertex of the triangle.

In some embodiments, the four propellers are substantially aligned in a same plane when the unmanned aerial vehicle is in the flying state.

In some embodiments, the four propellers consist of a first pair of the propellers and a second pair of the propellers. Within each pair the two propellers are in a substantially back-to-back configuration, when the unmanned aerial vehicle is in the rolling state.

In some embodiments, each passively reconfigurable joint further includes a stopper coupled to the propeller arm. The stopper is adapted to be urged against the body to prevent the propeller arm from moving beyond an angular limit.

In some embodiments, a spanned area of the body and the one or more propellers, when the unmanned aerial vehicle is in the flying state, is smaller than an area defined by one said wheel.

In some embodiments, the unmanned aerial vehicle switches from the rolling state to the flying state when generated thrusts by the propellers are greater than a predetermined threshold.

In some embodiments, the propeller arm is connected to an end of an extension arm extending from the body. Another end of the elastic component is connected to the extension arm at the location away from the revolute point.

In some embodiments, the extension arm is fixedly connected to the body.

One can see that exemplary embodiments of the invention provide a quadrotor that can both fly and roll. The proposed robot employs passively reconfigurable structures to enable the second mode of locomotion, tightly coupling the attitude of the robot to the rolling cage. The benefits are precise rolling and turning control as well as improved rolling efficiency.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 1b is a schematic diagram of the quadrolltor in the status of FIG. 1a.

FIG. 2b is a schematic diagram of the quadrolltor in the status of FIG. 2a.

FIG. 5c shows a rolling configuration of the quadrotor of FIG. 5a.

FIG. 8a is a photo of the prototype quadrotor showing the transition from the flight mode to the rolling mode, at t=0 s.

FIG. 8d is a photo of the prototype quadrotor showing the transition from the rolling mode to the flighting configuration, at t=0 s.

FIG. 8l is a photo of the prototype quadrotor showing it doing the 90° turn, at t=2 s.

In the drawings, like numerals indicate like parts throughout the several embodiments described herein.

DETAILED DESCRIPTION

Figure 1A:
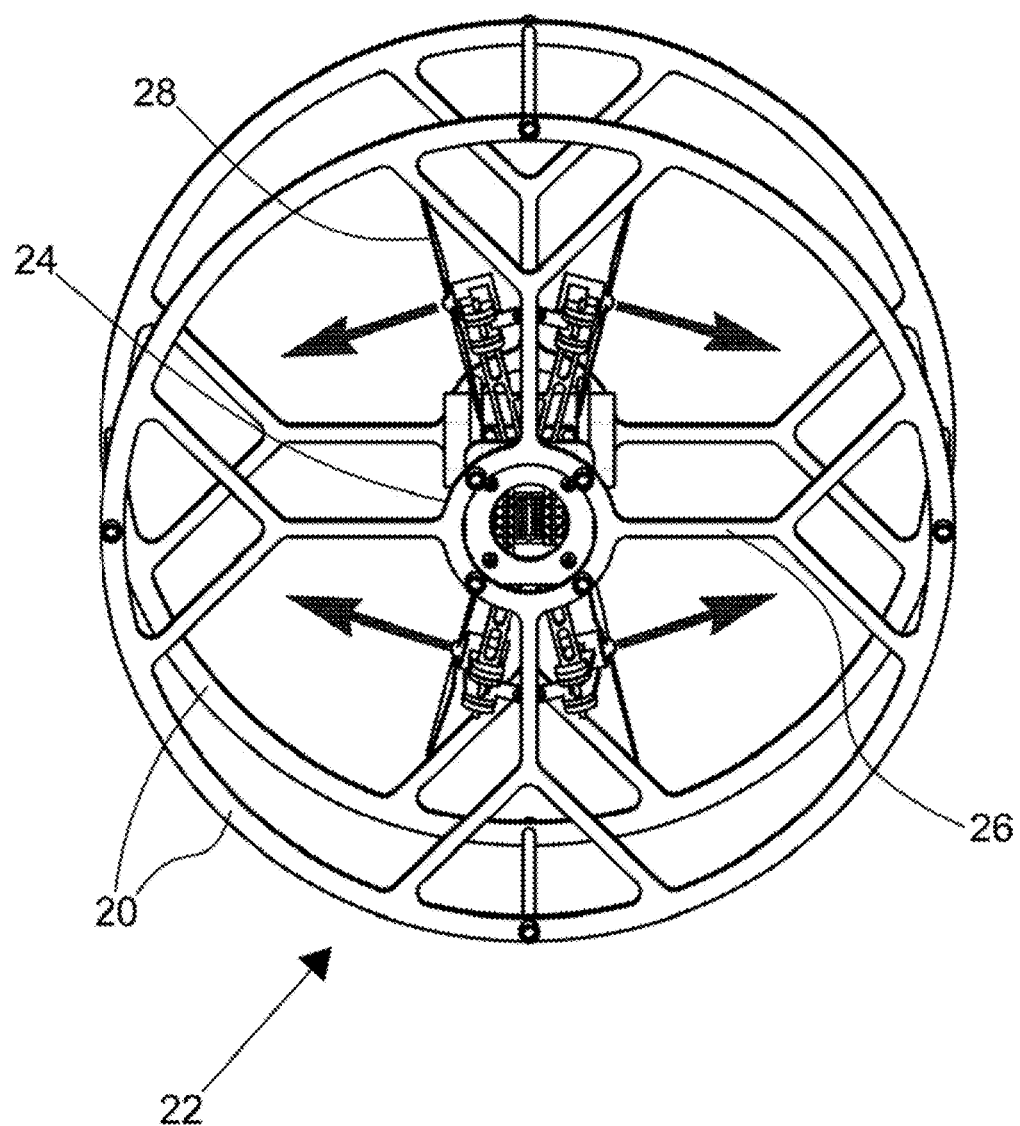
FIG. 1a is a photo of a quadrolltor according to a first embodiment of the invention, wherein the quadrolltor is in a rolling state.

Referring now to FIGS. 1a-2b, a first embodiment of the invention is an unmanned aerial vehicle, which is a quadrotor (also referred as a quadrolltor or a robot in this embodiment). The quadrotor is a rotorcraft for the hybrid aerial and terrestrial locomotion, emphasizing rolling efficiency and terrestrial maneuverability. The rotorcraft has the ability to roll with precision and efficiency. The actuation of the robot in both locomotion modes is achieved only by four propellers, based on the use of passive joints to re-orient the thrust vectors according to the commands. Hence, a reconfigurable airframe with the four passive revolute joints is devised to allow the robot to transform between various configurations to achieve the hybrid locomotion. The design lowers the power consumption in rolling, extending the feasible mission range.

In particular, for existing hybrid rotorcraft [20]-[22], [26], a body of the robot is attached to two large wheels on the sides through a low-friction axle. This way, the wheels are able to spin independently from the attitude of the robot. In order to roll, the robot pitches forward to create a forward thrust, similar to the flight strategy. In contrast, the quadrotor depicted in FIGS. 1a-2b contains a body 24 which is rigidly fixed to two protective wheels 20 at two opposite ends of the body 24, and rolls by the rotation about its original yaw axis. The two protective wheels 20 form a rolling structure 22 of the quadrotor, and the body 24 is mounted within the rolling structure 22 and at a center thereof. The quadrotor is placed in the axial direction of the rolling cage rather than radial direction. Because of the rigid fixation, the body 24 is connected non-rotatably to the rolling structure 32. In other words, there is no relative movement between the body 24 and the rolling structure 22, but the body 24 always rotates together with the rolling structure 22. As one can see from FIGS. 1a-2b to each wheel 20, the body 24 is connected via four spokes 26 which are separated from each other by 90° along the circumferential direction. Each of the four spokes 26 becomes bifurcated as it extends towards the rim of a corresponding wheel 20.

The body 24 receives and/or carries essential electronic components for the quadrotor to operate, including a battery, a microprocessor, a wireless transceiver, a memory, all of which are not shown in FIGS. 1a-2b. The electronic components and their working principles of a quadrotor are well-known to skilled persons in the art, and they will not be described in detail herein. External to the body 24, there are four propellers 28 connected to the body 24 via a passively reconfigurable module. The passively reconfigurable module includes four passively reconfigurable joints 30, and each propeller 28 is driven by a motor (not shown) that is mounted at a free end of a propeller arm 38 in a corresponding passively reconfigurable joint 30.

Figure 2A:
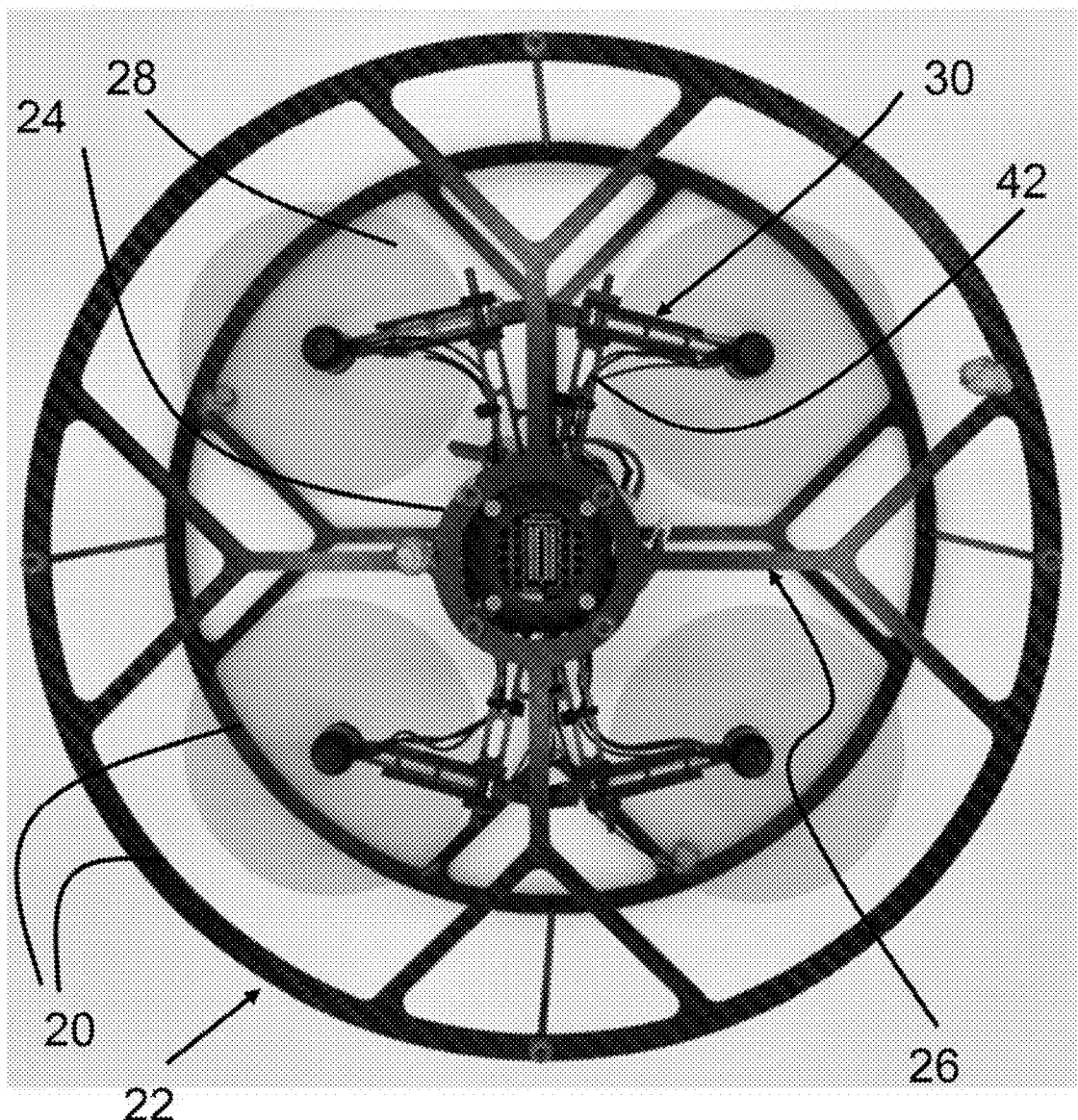
FIG. 2a is a photo of the quadrolltor of FIG. 1a, wherein the quadrolltor is in a flying state.
Figure 2B:
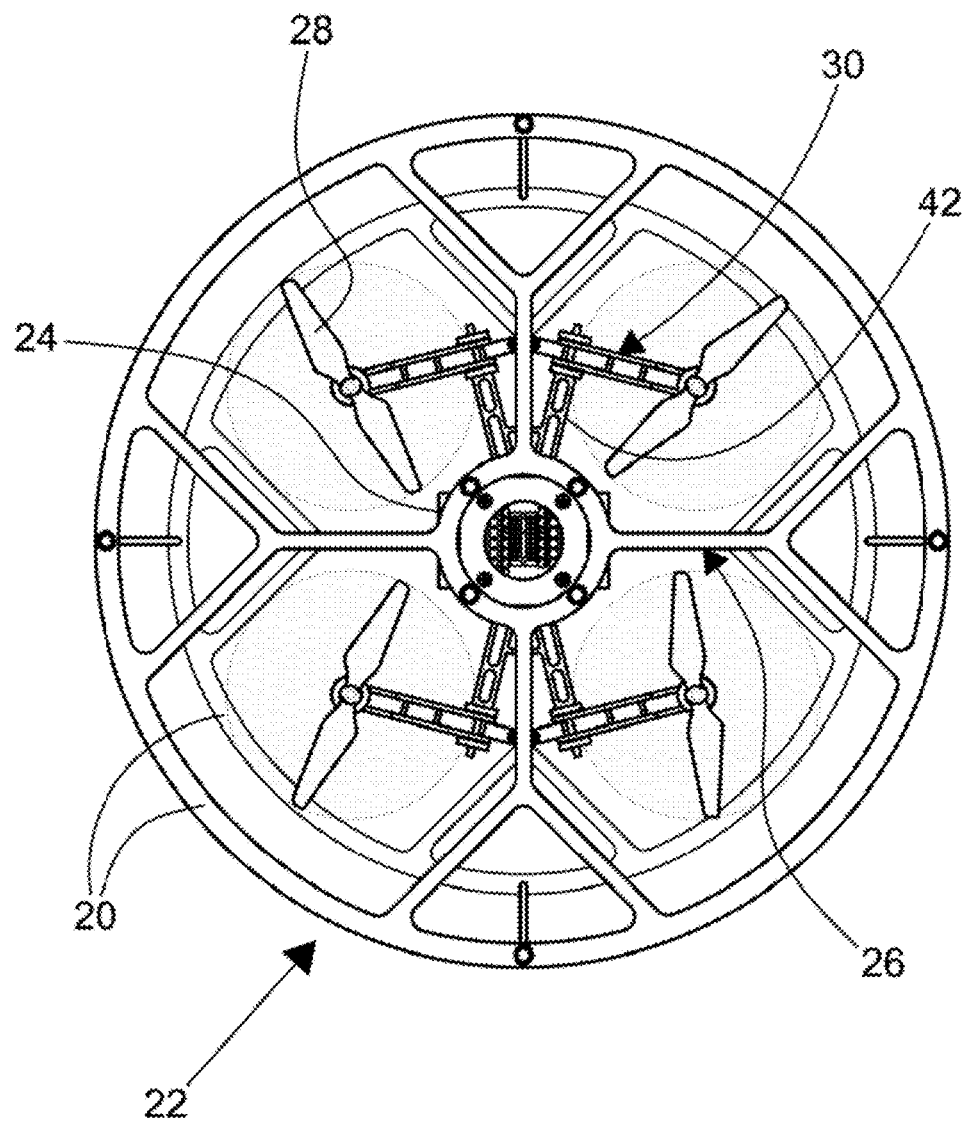
Figure 3:
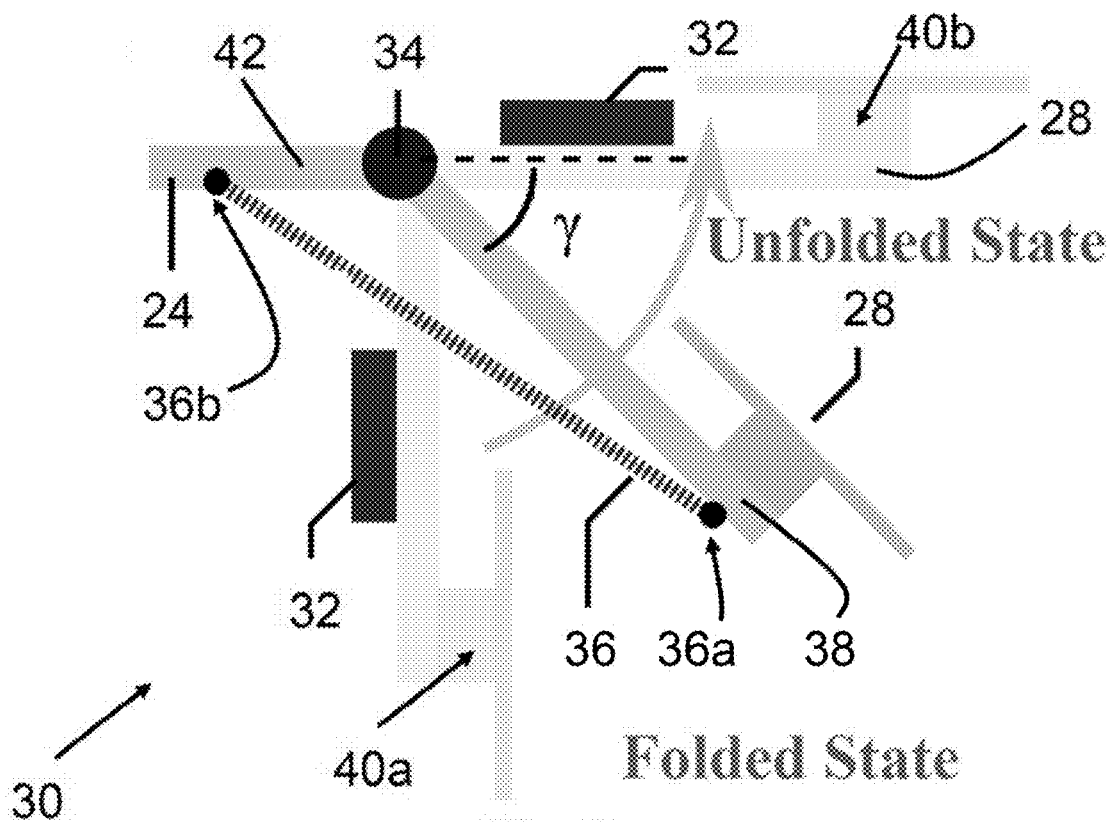
FIG. 3 is an illustration of the structure of a passively reconfigurable joint in the quadrolltor of FIGS. 1a-2b.

The passively reconfigurable joints 30 or the passively reconfigurable module refers to their ability of switching from one state to another state without having to be driven directly and mechanically by human hand or by a motor (e.g., via pinions or gears). Rather, as the propellers 28 are operating and their thrusts change (as a result of control by a user), the passively reconfigurable joints 30 may change their states, which will be described in more details below. Referring to FIG. 3, each passively reconfigurable joint 30 contains the propeller arm 38 pivotally connected to an extension arm 42 at a revolute point 34, and a coil spring 36 as an elastic component. As shown in FIGS. 1a-3, there are four extension arms 42 in the quadrotor, each corresponding to a passively reconfigurable joint 30. The extension arms 42 protrude outward from the body 24, and their orientations are fixed with respect to the body 24. All four extension arms 42 together form a central air frame of the quadrotor, which is considered as a mechanical ground as opposed to the movable part which are the propeller arms 38.

The spring 36 has its one end 36a connected to or adjacent a free end of the propeller arm 20) 38. Another end 36b of the spring 36 is connected to the extension arm 42 at a location away from the revolute point 34. The spring 36 is pre-stretched, and in a fully folded state (as shown in the "Folded State" of FIG. 3) the spring 36 has a shortest length. As a result, the passively reconfigurable joint 30 by default is in a 90° folded state shown in FIG. 3. In FIG. 3, the joint angle γ is 90° when the propeller arm 38 is fully folded and 0° when the propeller arm 38 is fully unfolded. In the fully folded state, the propeller 28 is closest to the body 24 in a position as indicated by the arrow 40a in FIG. 3. However, because of a stopper 32 (for example a rubber, a foam, or other resilient material) is attached to the propeller arm 38, the propeller arm 38 will not be pulled by the spring 36 to move beyond an angular limit (i.e., the vertical position indicated by the arrow 40a) as the stopper 32 then will be urged against the body 24, and as a result the propeller arm 38 will not physically contact the body 24 to avoid any damage caused to the two.

The working principle of the passively reconfigurable joint 30 will now be described (which is the same for all four passively reconfigurable joints 30 in the passively reconfigurable module). Without additional actuators, the passive revolute joints are the key feature that equips the robot with the terrestrial locomotion. The passively reconfigurable structures are enabled by the pre-stretched elastic springs to generate a nonlinear restoring torque. The nonlinear response and joint stoppers ensure that the propeller axis pointing in two directions when the propeller thrust is respectively large and low.

Figure 1B:
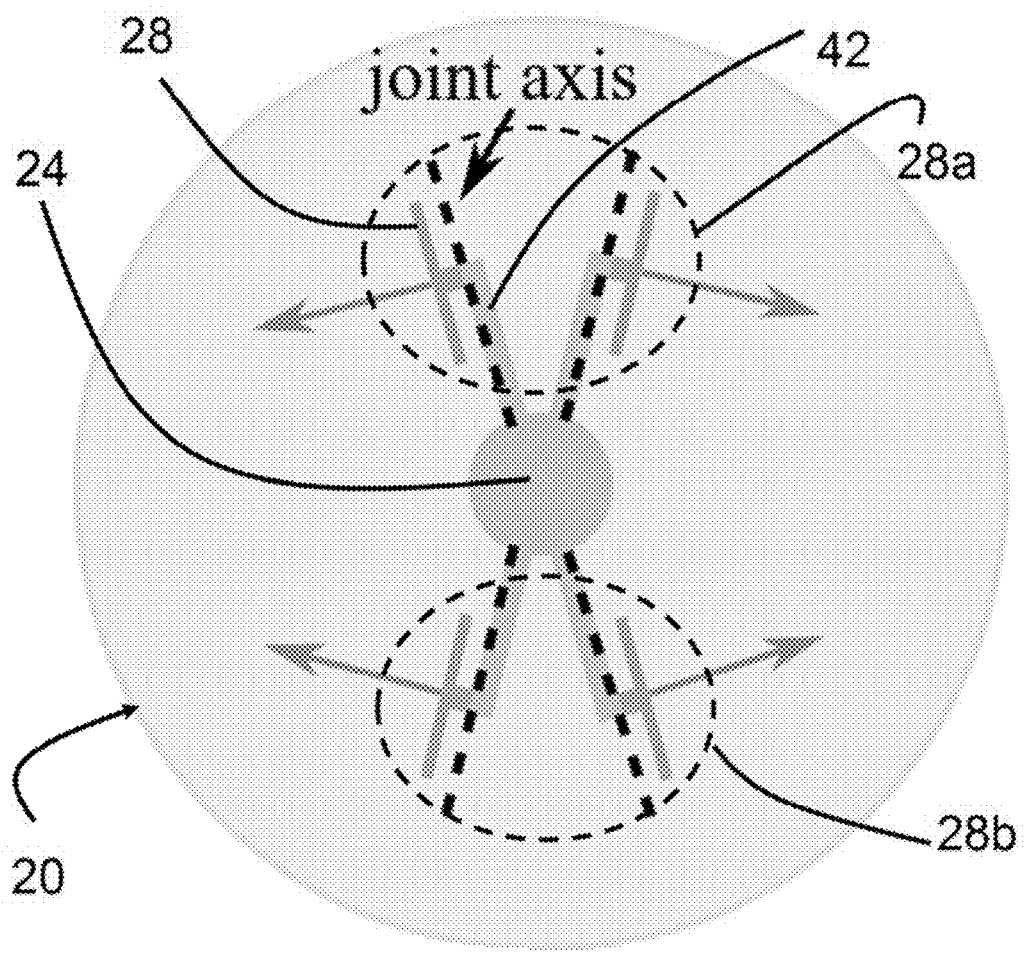

In particular, each reconfigurable joint 30 has one rotational degree of freedom. When the motor for the corresponding propeller 28 is not energized, or if the motor is running but the thrust produced by the propeller 28 is not exceeding a predetermined threshold (for example, 0.15 mg which is chosen and designed using a method to be described below, where m is the mass in kilograms, and g is the acceleration due to gravity) a spring force of the spring 36 (as it is pre-stretched) is not overcome, and the spring force which is a contracting force between two ends 36a, 36b of the spring 36 pulls the propeller arm 38 and in turn the propeller 28 toward the extension arm 42, so that the propeller arm 38 and in turn the propeller 28 stay in the vertical position indicated by the arrow 40a. In this fully folded state, part of the extension arm 42, the spring 36, and the propeller arm 38 form three sides of a virtual right triangle (not shown). The revolute point 34 is located at a vertex of the triangle. When all the passively reconfigurable joints 30 are in the folded state, the appearance of the quadrotor is shown in FIGS. 1a-1b, which corresponds to the rolling state of the quadrotor. Note that in FIGS. 1a-1b, the propeller arms 38 and the right angle formed by each propeller arm 38 and a corresponding extension arm 42 are not visible clearly because the propeller arm 38 overlaps with the corresponding extension arm 42 in the view of FIGS. 1a-1b.

Because of the passively reconfigurable joints 30, the propellers 28 are in the folded position when unactuated. However, when a propeller 28 spins fast enough to generate sufficient torque to overcome the restoring torque, such that the trust prevails the restoring force of the spring 36, its corresponding passively reconfigurable joint 30 unfolds. In particular, for each passively reconfigurable joint 30, when the thrust of a propeller 28 exceeds the predetermined threshold (0.15 mg as in the example mentioned above), the spring force of the spring 36 is no longer sufficient to keep the propeller arm 38 in the vertical position (that is, the fully folded state) as shown in FIG. 2. As a result, the thrust of the propeller 28 moves the propeller arm 38 from the folded state towards an unfolded state. By strategically selecting suitable parameters (such as the stiffness and natural length of the elastic component), the passively reconfigurable joints 30 meet the requirements of both modes of locomotion.

The flight mode of the quadrotor is achieved when all passively reconfigurable joints 30 are fully unfolded. The propeller axes are then aligned with principal axis of the cylindrical cage and the robot behaves as a conventional quadrotor as shown in FIG. 2b. In other words, when the propeller arm 38 arrives at the fully unfolded state (shown as "Unfolded State" in FIG. 3), the robot becomes in an appearance a conventional quadrotor as shown in FIGS. 2a-2b, where all four propellers 28 are substantially aligned in a same plane which corresponds to a flying state of the quadrotor. FIG. 3 shows the position of the propeller 28 (indicated by the arrow 40b) when its corresponding passively reconfigurable joint 30 is in the fully unfolded state. When the quadrotor is in the flying state, the total spanned area of the body 24 and the four propellers 28, is smaller than the circular area defined by each of the wheels 20. Also, as shown in FIG. 3 the extension arm 42 becomes parallel with the propeller arm 38 in the unfolded state, and in fact the extension arm 42 form a straight line with the propeller arm 38. The spring 36 is also substantially at the same line with the extension arm 42 and the propeller arm 38 in the unfolded state.

It should be noted that the states of the passively reconfigurable joints 30 are not limited to the fully folded state and the fully unfolded state as shown in FIG. 3. In fact, as shown in FIG. 3, there can be one or more intermediate states where the propeller arm 38 is kept by precisely controlling the thrust at an angular position between the fully folded state (the vertical position in 20) FIG. 3), and the fully unfolded state (the horizontal position in FIG. 3).

The working principle of the quadrotor in its rolling state will now be described. To be able to efficiently generate the torque for rolling, the four passively reconfigurable joints 30 are deployed. In the rolling mode, the propelling axes (indicated by the four arrows in FIG. 1b) of the four propellers 28 are orthogonal to the rolling axis (not shown, which is the rotational axis of the wheels 20) of the quadrotor. The four propellers 28 can be divided into a first pair 28a of the propellers 28 and a second pair 28b of the propellers 28. Within each of the pairs 28a, 28b the two propellers 28 are in a substantially back-to-back configuration, as shown in FIG. 1b when the quadrotor is in the rolling state. As illustrated in FIG. 1b, the propeller directions permit the robot to readily produce positive or negative rolling torque, as well as turning torque, depending on which propeller(s) 28 is actuated. This results in precise controlled rolling and turning, as well as efficient low-speed rolling. It becomes possible for the robot to track a complex terrestrial trajectory or take still photos of the surroundings with an onboard camera at different panning and tilting angles in the rolling mode. Furthermore, compared to the conventional hybrid robots [20]-[22], [26], the robot in FIGS. 1a-3 can negotiate small openings with the gap-to-drone ratio [31] of ≈0.5, rivaling the state of the art [31], thanks to the narrow profile in the rolling mode. This is advantageous for operations in cluttered environments.

With more details, in the fully folded state, the propeller axes are perpendicular to the rolling axis. When lightly actuated, the passively reconfigurable joint 30 remains folded and the thrust induces the rolling torque. For the quadrotor shown in FIG. 1b, in the rolling mode two propellers 28 generate positive rolling torque and the other two produce negative rolling torque. Hence, the robot is able to roll on a surface forward and backward, or accelerate and decelerate, depending on which pair of the propellers are activated. To create a turn in the terrestrial mode after the robot comes to a halt, one propeller 28 is actuated with a sufficiently high command so that a corresponding passively reconfigurable joint 30 unfolds and the motor shaft axis of the motor corresponding to the particular propeller 28 becomes parallel to the rolling axis. The distance between the rotor axis and the rolling axis represents the moment arm of the turning torque, which is amplified when this lies horizontally.

Figure 4A:
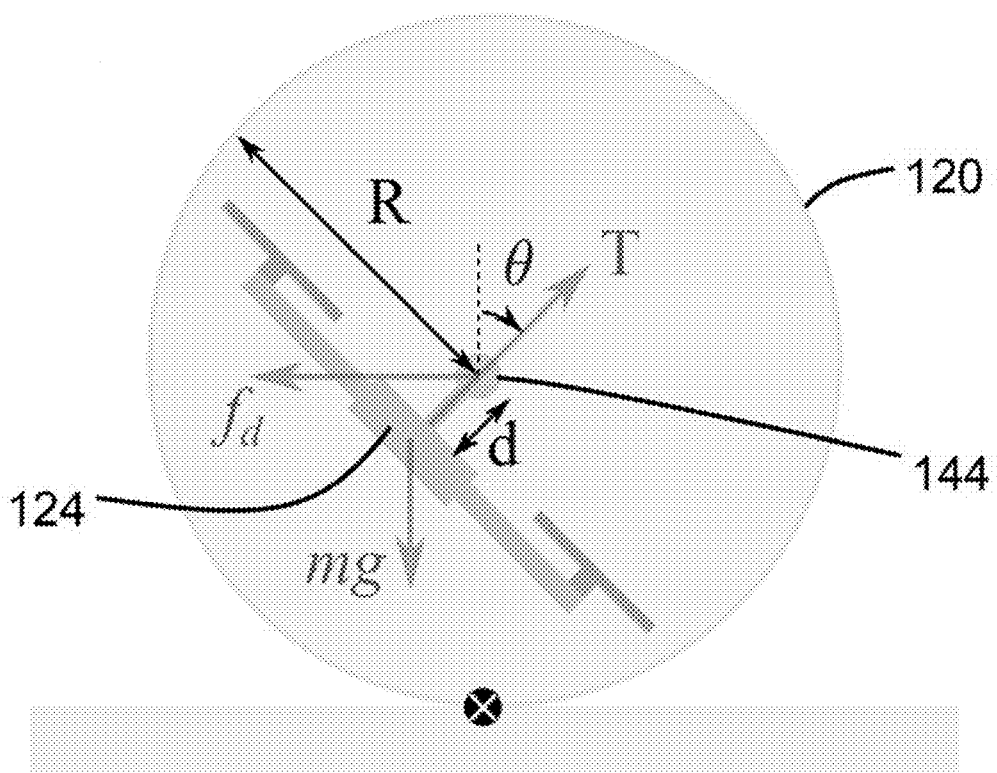
FIG. 4a shows the design of a conventional rolling quadrotor, in which the robot's attitude is decoupled from the rolling cage.
Figure 4B:
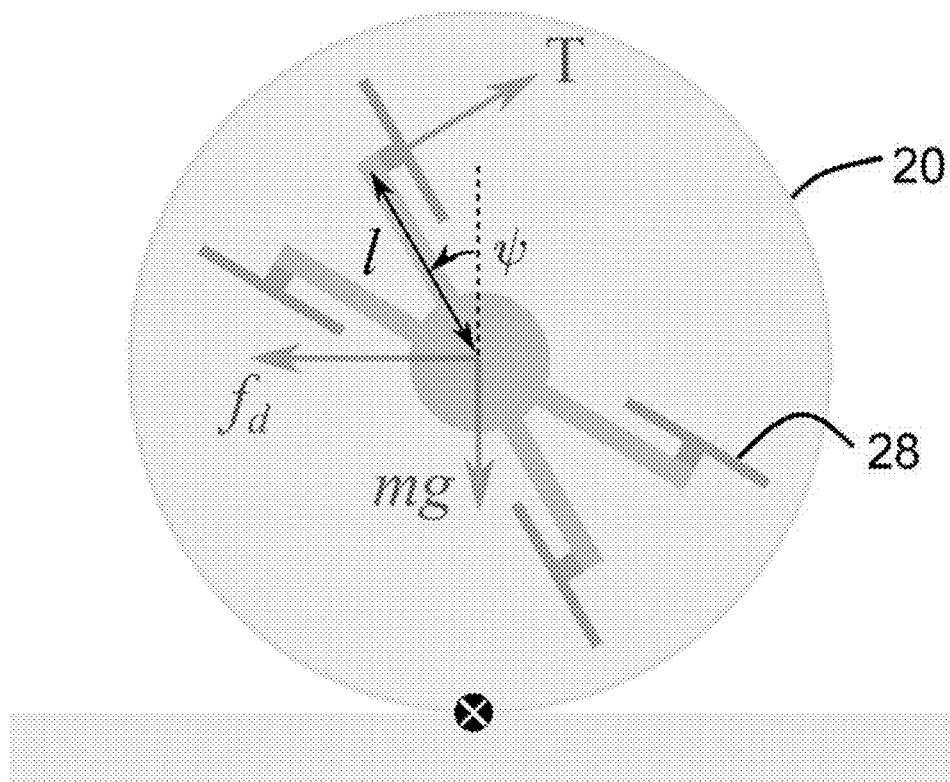
FIG. 4b shows the quadrotor of FIGS. 1a-2b in its rolling state, in which the same angle $\psi$ characterizes both the rolling angle and the orientation of the robot.

Next, a high-level analysis to obtain the minimal net thrust 7 for the robots in FIG. 4a-4b is provided. FIGS. 4a-4b both show equilibrium conditions for the respective robot to roll at constant speed. Ground normal forces are omitted and ground friction is absent when the speed is constant. The same angle $\psi$ characterizes both the rolling angle and the orientation of the robot in each of FIGS. 4a and 4b. The minimal net thrust T is needed to generate to sustain a constant rolling speed v. Between the design of FIG. 4a (which is a conventional quadrotor) and the design of FIG. 4b (which is the quadrotor of FIGS. 1a-2b), the design with lower T is then presumed to be more efficient in rolling.

For conventional rolling quadrotors in [20], [21], [26], their designs are abstracted in FIG. 4a. The robot body is offset from the main axis of a lightweight cylindrical frame of radius R by some distance d. With the frictionless revolute joint [21], the attitude of the robot is decoupled from the rolling motion of the cage. When rolling, the robot may pitch forward by an angle θ. When rolling forward at speed v, the robot is subject to aerodynamic drag $f_d$ in the direction opposite to the translational motion, assumed to be acting at the center of the cage. The drag is presumed to be proportional to the translational speed v as $f_d$=bv.

To obtain the equilibrium condition for rolling without slipping, the rotational dynamics of the quadrotor in FIG. 4a are inspected. Since the ground contact point is instantaneously at rest, it is taken as a reference for deriving the equation for the balance of moment (using the contact point as a reference eliminates the need to explicitly consider the normal force and friction). With the rotational axis, the torque produced by the robot is not propagated to the rolling cage. Only the force (net thrust T and weight mg) is transferred to the rotating wheel via the shaft. As a result, the balanced moment condition for the robot in FIG. 4a is TRsinθ−bvR=0, independent of mg and d. The optimal net thrust T is with θ=90'. That is the robot pitches fully configuration for maximizing the rolling speed v for a given forward. The equation reduces to $$T=bv, \tag{1}$$

which states that the thrust T and the drag $f_d$=bv cancel. In practice, θ<90° is usually preferred to simplify the control problem [21], such configuration would render the robot less efficient in rolling. Moreover, as θ approaches 90°, the robot cannot readily decelerate or reverse the rolling direction.

Turning to the quadrotor in FIG. 4b. The robot takes a shape dissimilar to a regular quadrotor when it is in the rolling mode as mentioned above. In this design, the robot's attitude is fully coupled with the outer frame (i.e., the rolling structure). $\psi$ is defined to describe the instantaneous orientation of the robot and/to be the distance from the center to each propeller 28. While rolling, only one upper propeller 28 is actuated with the generated thrust T as shown in FIG. 4b. The robot is subject to similar drag $f_d$=bv. The balance of moment condition, taken about the ground contact point is $$T(R\cos\psi+1)-bvR=0, \tag{2}$$

which is dependent on w. To reduce the magnitude of T required, one may consider a $\psi$-dependent T command such that T is increased when cos $\psi$ is positive and decreased when cos $\psi$ is negative. For instance, when $T(\psi)=T_0(1+\cos\psi)$, $T(\psi)$ becomes $T_0$ on average and (2) averages to $$T_0=bv(1-(2l-R)/(2l+R)). \tag{3}$$

Comparing (1) with (3), it can be seen that the quadrotor in FIG. 4b requires lower thrust to overcome the same amount of drag force as long as l>R/2. Or, in an ideal case, if T is chosen as an impulse: $T(\psi)=T_0\delta(\psi)$, one can find that $$T_0=bv(1-l(l+R)). \tag{4}$$

That is, $T_0$<bv as long as l>0. The design shown in FIG. 4b is deemed more effective as compared to that in FIG. 4a. This is despite the fact that the joint friction and the need to actively control the attitude in the conventional design are neglected. As per momentum theory, power relates to thrust according to $P\propto T\sqrt{T}$ [7], [9]. This means the design in FIG. 4b is anticipated to be more efficient in rolling than conventional robots. Besides, if some propellers 28 are arranged oppositely (i.e., in a back-to-back configuration) as illustrated in FIG. 4b, the robot is able to quickly reverse the rolling motion. This is unlike the design in FIG. 4a, in which the attitude change must be accomplished to alter the rolling direction.

Figure 5A:
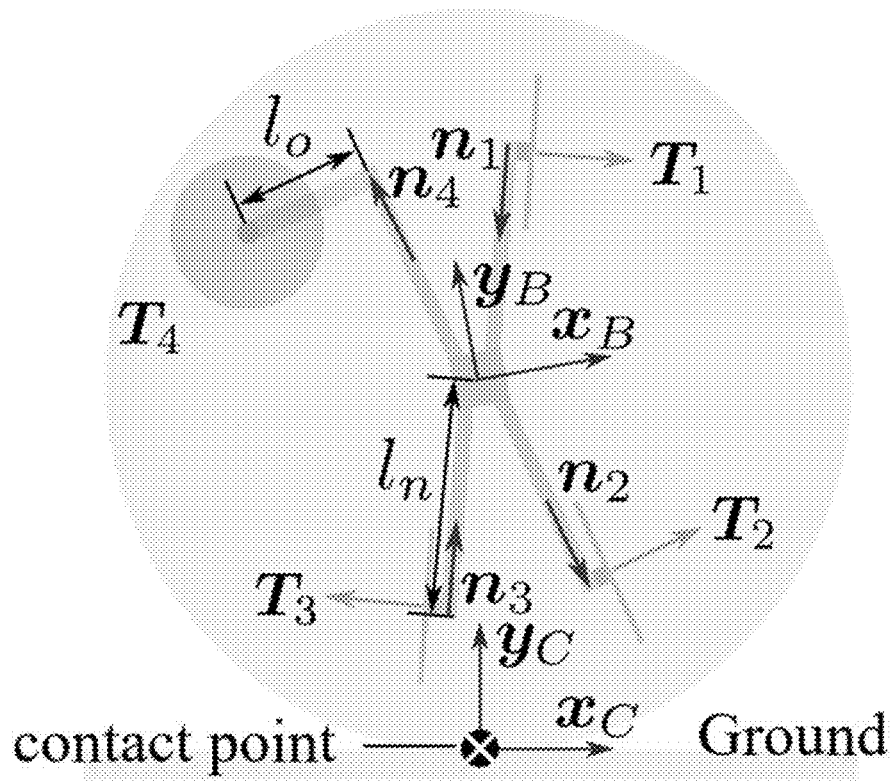
FIG. 5a shows definitions of vectors and arm lengths in a side view of the quadrotor in FIGS. 1a-2b.
Figure 5B:
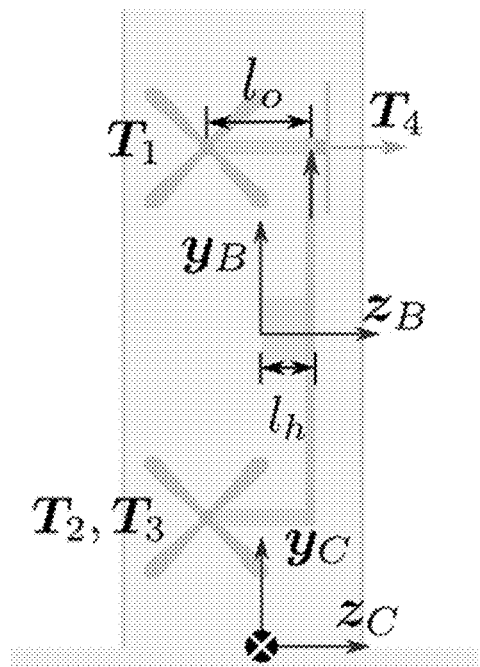
FIG. 5b shows definitions of vectors and arm lengths in a front view of the quadrotor in FIGS. 1a-2b.

In the next section, an introduction of the robot's physical parameters and the relevant coordinate frames is described. In addition, the modeling and control for hybrid locomotion, with the emphasis on controlled rolling and turning, are also described. FIGS. 5a-5b depict a robot standing on the ground. For an illustration purpose, three of the revolute joints (joints 1, 2, and 3) are folded and the 4$^{th}$ joint is shown unfolded. The body frame $\{x_B, y_B, z_B\}$ is located at the center of mass (CM). To describe the rolling and turning motion, the ground contact frame $\{x_C, y_C, z_C\}$ is defined. By definitions, $z_C$ and $z_B$ align, while $y_C$ points vertically up.

Let an index $i \in \{1,2,3,4\}$ represent the $i^{th}$ propeller and $n_i$ be unit vectors indicating the axes of the folding joints parallel to the inner propeller arms, defined in the body frame (pointing radially inward or outward, indicating the unfolding direction). As seen in FIGS. 5a-5b, the inner propeller arms of length $l_n$ are offset from the center of mass by the distance $l_h$ along $z_B$. The position of the $i^{th}$ propeller with respect to the body frame when folded is denoted by $l_{i,f} = l_h e_3 \pm l_n n_i - l_o e_3$ with $l_o$ being the length of the folding link. When unfolded (e.g. the fourth propeller in FIG. 5a), the location of the $i^{th}$ propeller becomes $l_{i,u} = l_h e_3 \pm l_n n_i + l_o e_3 \times n_i$.

Figure 5C:
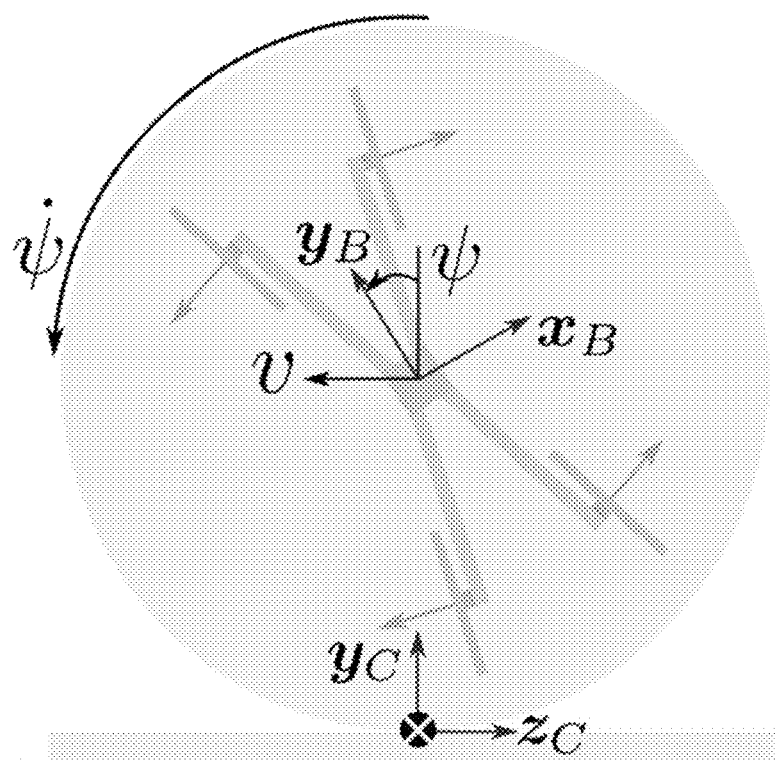

For the quadrotor shown in FIGS. 5a-5d, rolling and turning are considered separately. This reduces the motion in each case to one degree of freedom, simplifying the control problems without significantly affecting the capability of the robot. Considering rolling without slipping, the rolling motion can be entirely described by the yaw angle $\psi$ (defined as the angle between $y_B$ and $y_C$ measured about $z_C$) as shown in FIG. 5c. The rotational dynamics of the robot is derived with respect to the origin of the ground contact frame, which is instantaneously at rest, as $$(J_\psi + mR^2)\ddot{\psi} = \tau_\psi, \tag{5}$$

where $J_\psi$ is the yaw inertia of the robot, and $\tau_\psi$ is total torque acting on the robot with respect to $z_C$. To regulate the rolling motion, a proportional-derivative (PD) controller is proposed to compute the desired torque $\tau_{\psi,d}$. Let $\psi_d$ denote the desired rolling angle such that the angular error becomes $\psi - \psi_d$. The PD control law is $$\tau_{\psi,d} = (J_\psi + mR^2)\ddot{\psi}_d - k_{\psi,d}(\dot{\psi} - \dot{\psi}_d) - k_{\psi,p}(\psi - \psi_d) \tag{6}$$

where $k_{\psi,\cdot}$'s are positive gains. The closed-loop dynamics guarantee $\psi \to \psi_d$ if $\tau_\psi \to \tau_{\psi,d}$. Notice that the parameters in (6) can be adjusted for two different objectives. When the proportional gain $k_{\psi,p}$ is zero, the controller only regulates the angular rate rolling velocity. This is suitable for distant rolling. On the other hand, if $\dot{\psi}_d$ is chosen as zero, (6) directly controls the angle $\psi$. This is equivalent to controlling the robot's position. Lastly, to ensure $\tau_\psi \to \tau_{\psi,d}$, the implemented torque generation method will be described below.

To alter the travel direction on the ground, a strategy for turning is devised. A turning maneuver is only executed when the robot is not rolling (this can be accomplished by controlling the rolling angle $\psi$ to be constant). To generate the turning torque (about the axis $y_C$), one propeller is actuated at a relatively large command so the joint unfolds. A counter torque can be produced in a similar fashion by another propeller if needed.

Figure 5D:
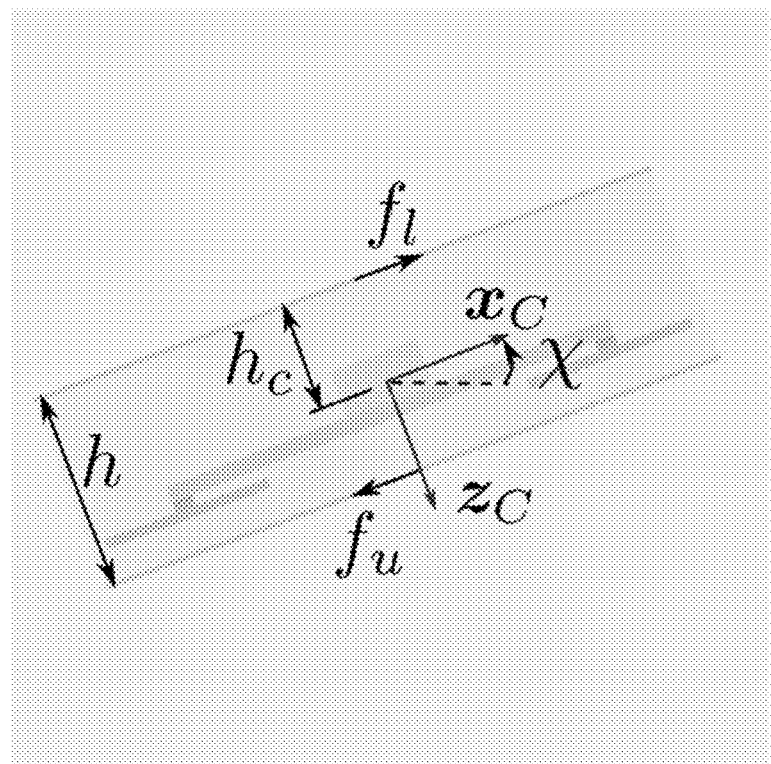
FIG. 5d shows turning dynamics of the quadrotor of FIG. 5b.

The dynamics associated with turning is captured by FIG. 5d. The rolling angle $\chi$ is defined as the rotation about the axis $y_C$, which passes vertically through the CM, with respect to some reference. Let $\tau_\chi$ be the actuated torque in the direction of $y_C$ (how this is generated will be discussed in detail below). The turning motion results in the relative displacement between the contact points of the rims of the cage and the ground in the direction parallel to $x_C$. This results in the opposing friction forces $f_u$ and $f_l$. As a consequence, the equation of motion is $$J_\chi \ddot{\chi} = \tau_\chi - f_u(h - h_c) - f_l h_c, \tag{7}$$

where $J_\chi$ is the moment of inertial of the robot computed with respect to the axis $y_C$. In practice, this can be approximated as the average between the roll and pitch inertias. Herein, h denotes the width of the robot in this configuration and $h_c$ is the distance from the base face to the CM. By design, the CM is located near the center of geometry, rendering $h - h_c \approx h_c \approx h/2$. This reduces (7) to $J_\chi \ddot{\chi} = \tau_\chi - (f_u + f_l)h/2$. Both $f_u$ and $f_l$ are related to the friction coefficient $\mu$ and the ground normal forces. Since the sum of the normal forces equals to the weight of the robot mg, the equation becomes $$J_\chi \ddot{\chi} = \tau_\chi - \mu mgh/2. \tag{8}$$

As a consequence, the turning angle $\chi$ can be controlled to the desired angle $\chi_d$ using the following linear control law $$\tau_{\chi,d} = \mu mgh/2 + J_\chi \ddot{\theta}_d - k_{d,\chi}(\dot{\chi} - \dot{\chi}_d) - k_{\chi,p}(\chi - \chi_d) - k_{\chi,i}\int(\chi - \chi_d)dt, \tag{9}$$

where $k_{\chi,\cdot}$'s are positive control gains. Notice that unlike the rolling controller described by (6), the integral term is included. The compensation provided by the integral term can deal with model uncertainties and drastically improve the turning performance. For example, in the case that the propeller thrust, which is aligned with $z_B$, induces some friction component in the direction of $z_B$ or ($z_C$), the sum of $f_u$ and $f_l$ component in the direction parallel to $x_C$ may be smaller than $\mu$mg as assumed by (8). Furthermore, it is difficult to precisely estimate the friction coefficient $\mu$ between the robot and the ground surface. These factors render the term $\mu mgh/2$ in (9) highly imprecise. The use of the integral term can efficiently handle the modeling uncertainties and ensure that $\chi \to \chi_d$ provided that $\tau_\chi$ approaches $\tau_{\chi,d}$.

Figure 6A:
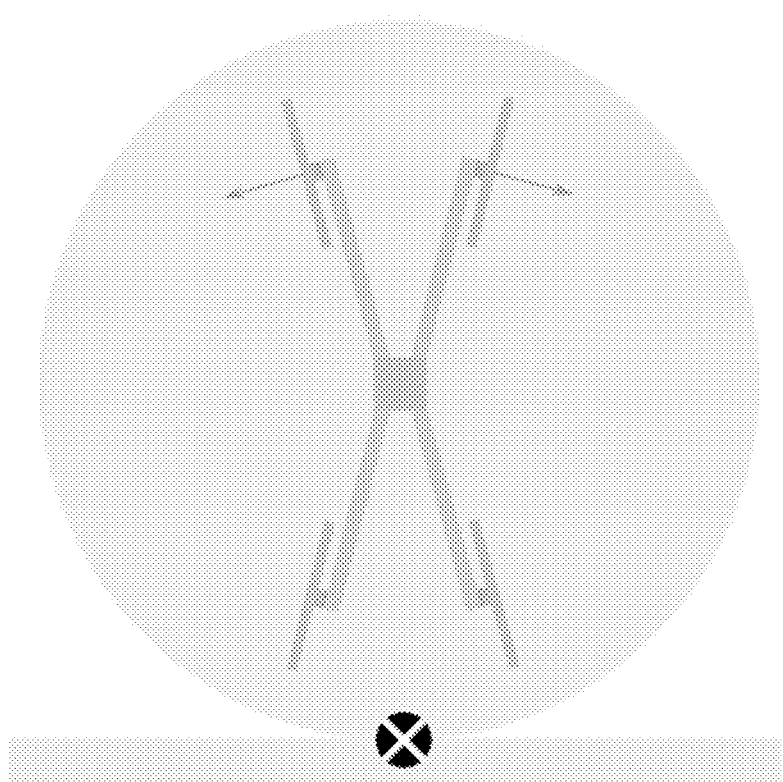
FIG. 6a shows rolling and turning torque generation of the quadrotor, where the upper pair of propellers in the figure are used for rolling.

To evaluate the mapping from $T_i$'s to $\tau_\psi$ and $\tau_\chi$, the drag torque of the propellers is neglected as the thrust components dominate. In the rolling mode, a pair of folded propellers further away from the ground contact (pointing approximately horizontally) is used to generate positive and negative $\tau_\psi$. For instance, for $-90° \leq \psi \leq 90°$ (see FIGS. 5c and 6a), $T_1$ and $T_4$ are chosen. In the ground contact frame, $Re_2 + R_z(\psi)l_{i,f}$ is the position of the $i^{th}$ propeller and $R_z(\psi)(e_3 \times n_i)$ is the force direction provided that $R_z(\psi)$ is the rotation matrix. Therefore, $$\tau_\psi = \Sigma_{i=1,4} e_3^T (Re_2 + R_z(\psi)l_{i,f}) \times R_z(\psi)(e3 \times n_i), T_i \tag{10}$$

and the sum changes to i=2, 3 for $90° \leq \psi < 270°$. In comparison, the previous robot with only two folded arms cannot generate negative rolling torque. The new configuration improves the efficiency and rolling control as outlined earlier.

Figure 6B:
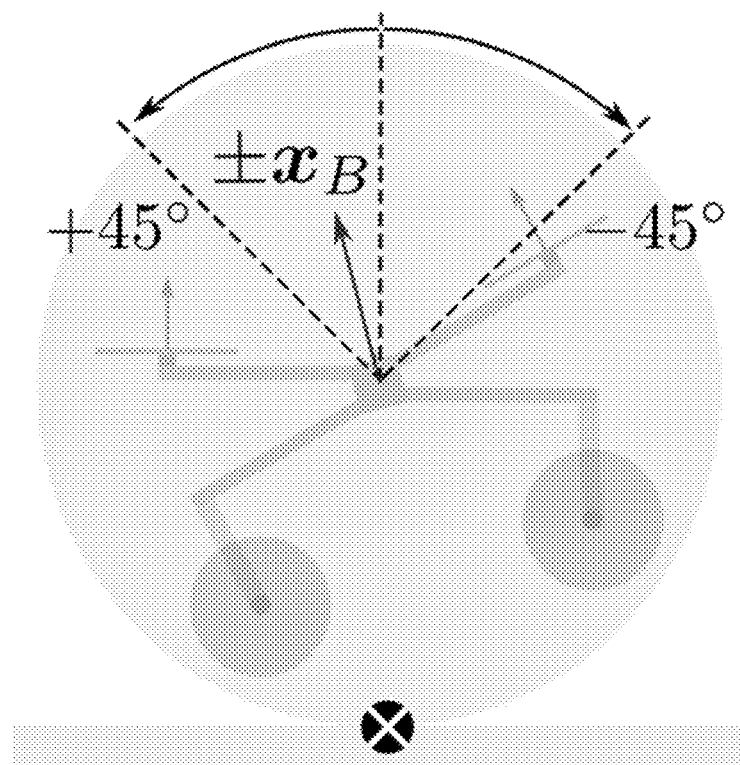
FIG. 6b shows the state when $x_B$ is within 45° of the vertical direction, where two lower propellers are responsible for producing the turning torque.
Figure 6C:
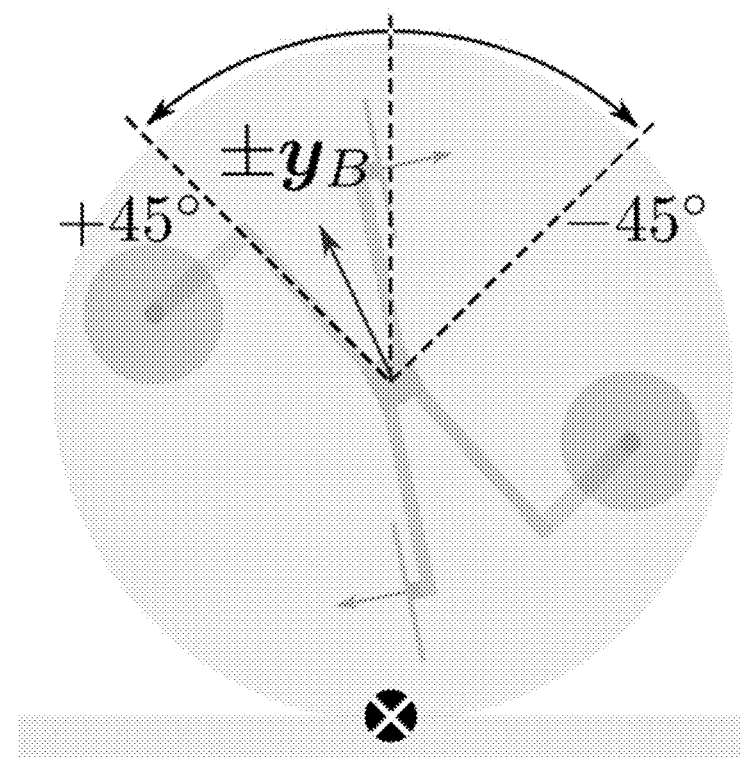
FIG. 6c shows the state when $y_B$ is within 45° of the vertical direction, where two opposite propellers are responsible for producing the turning torque.

In the turning mode, two propellers are reserved for producing the rolling torque $t_\psi$ (to keep the rolling angle $\psi$ constant) and the other two propellers are assigned for creating the turning torque $T_\chi$. The combination depends on the instantaneous $\psi$ angle. To make sure it is always possible to generate both positive and negative turning torque, two bottom propellers are used for turning when the axis $x_B$ is within 45° of the vertical direction (FIG. 6b), leaving the other two for controlling $\psi$. On the other hand, when the axis $y_B$ is within 45° direction of the vertical (FIG. 6c), two opposite propellers that are further apart are used for turning and the other pair is used for stabilizing $\psi$. The generated rolling torque is the same as (10), but the sum is over different propellers. To compute the mapping for the turning torque, we determine the torque with respect to the body frame as $\Sigma_i l_{i,u} \times e3 \, T_i)$. The turning torque is this torque projected on to the ye axis:

$$\tau_\chi = \Sigma_i e_2^T R_z(\psi)(l_{i,u} \times e3 \, T_i) \tag{11}$$

where the sum is for the corresponding pair of propellers.

Lastly, the thrust commands can be evaluated based on $\tau_{\psi,d}$ and $\tau_{\psi,d}$ by inverting (10) and (11).

The control methods to switch between the two operating modes are described. The switch from flying to rolling is simple in comparison. After landing, a single contact point on the ground is chosen as a pivot. A combination of propelling commands is used to generate torque about a horizontal axis that passes through the pivot. To do so, the commands must be sufficiently large to unfold the propelling arms. Propellers located further away from the pivot are preferred to amplify the moment arms. On the other hand, the transition from the rolling state to flight is accomplished by a dynamic maneuver. This is because in the rolling state, the torque produced by folded propellers can only accelerate or decelerate the rolling motion. Meanwhile, the torque produced by an unfolded propelling arm would induce the robot to turn upside down instead. The solution makes use of the nonlinear property of rotations. By timely commanding the robot to suddenly turn while rolling, the addition of two angular velocity vectors flips the robot in the desired direction. The robot then completes the maneuver with its $z_B$ axis orienting upward.

To validate the effectiveness of hybrid aerial terrestrial quadrotor as shown in FIGS. 1a-2b, several experiments were carried out. In terms of prototype fabrication, the outer airframe was constructed from 3-mm-thick carbon fiber sheets and carbon fiber rods (3 mm in diameter). The radius of the outer airframe is R=160 mm; and the robot height is h=150 mm, resulting in the gap-to-drone ratio of <0.5. When lying flat, the distance from the ground to the COM is $h_c$=80 mm. The offset from the inner airframe to the COM is $l_h$=35 mm. Four brushless motors (EMAX ECO 1106 4500 KV) are employed with 3.5-inch 3-blade propellers. The motors were mounted symmetrically on the passive joints with the length of the inner arm $l_n$=77 mm. The length of the folding arm is $l_o$=48.5 mm. Rubber bands with the resting length $l_o$=30 mm and linear stiffness $k_e$=214 N/m were adopted as elastic components for the passive joints.

A flight control board (Bitcraze, Crazyflie Bolt) and a 4-in-1 electronic speed controller (HAKRC) were incorporated. The robot is powered by a 3000-mAh 2 S battery. For measuring the power consumption, a Raspberry Pi Zero 2 W is employed with a separate ADC (ADS1115) to log the voltage (Risym, 1:5 divider ratio) and current (Risym, ACS712ELC-20 A) of the battery. To enable a reliable outdoor flight, an onboard positioning device (Bitcraze, Flowdeck v2) was employed. The board contains time-of-flight and optical flow sensors, allowing the robot to reliably regulate its altitude and translational speed without visual odometry. The total mass of the quadrolltor, shown in FIG. 1a, is m=350 g.

Indoor experiments were conducted with the motion capture (MOCAP) system (OptiTrack Prime 13W) for providing position feedback and ground-truth measurements. The attitude feedback was provided by an onboard inertial sensor through a complimentary filter. A ground station computer running Python scripts communicated with the Crazyflie Bolt through radio for sending commands and data logging.

Figure 7A:
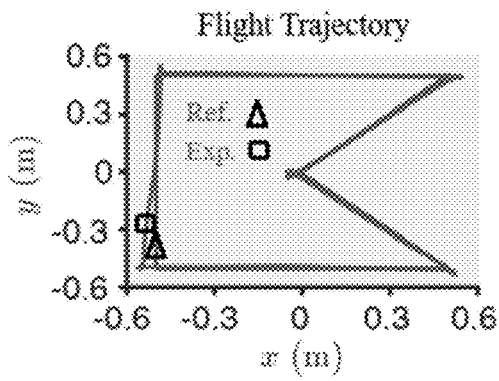
FIG. 7a shows reference results and experimental results of flight trajectory.

Firstly, flight ability of the robot is verified by instructing the robot to fly through several waypoints. The flight was conducted in the arena with the MOCAP system used for the position feedback. With a standard cascaded flight controller described in [24], the robot flew over 5.81 m in 25 s at a constant altitude. The realized and reference trajectories are plotted in FIG. 7a. The root mean square error (RMSE) of the position is 4.1 cm. The outcome confirms that the flight performance is not visibly affected by the use of passive joints as the airframe remained sufficiently rigid at relatively large propeller commands as designed.

Figure 7B:
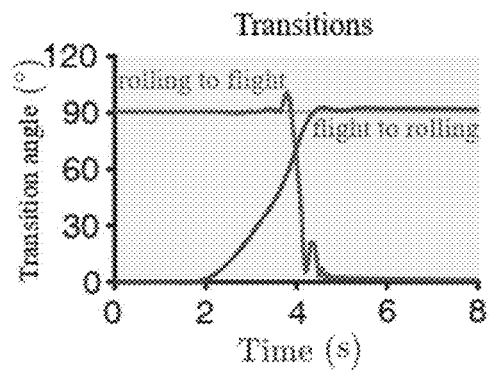
FIG. 7b shows reference results and experimental results of transitions between the flight mode and rolling mode.
Figure 8B:
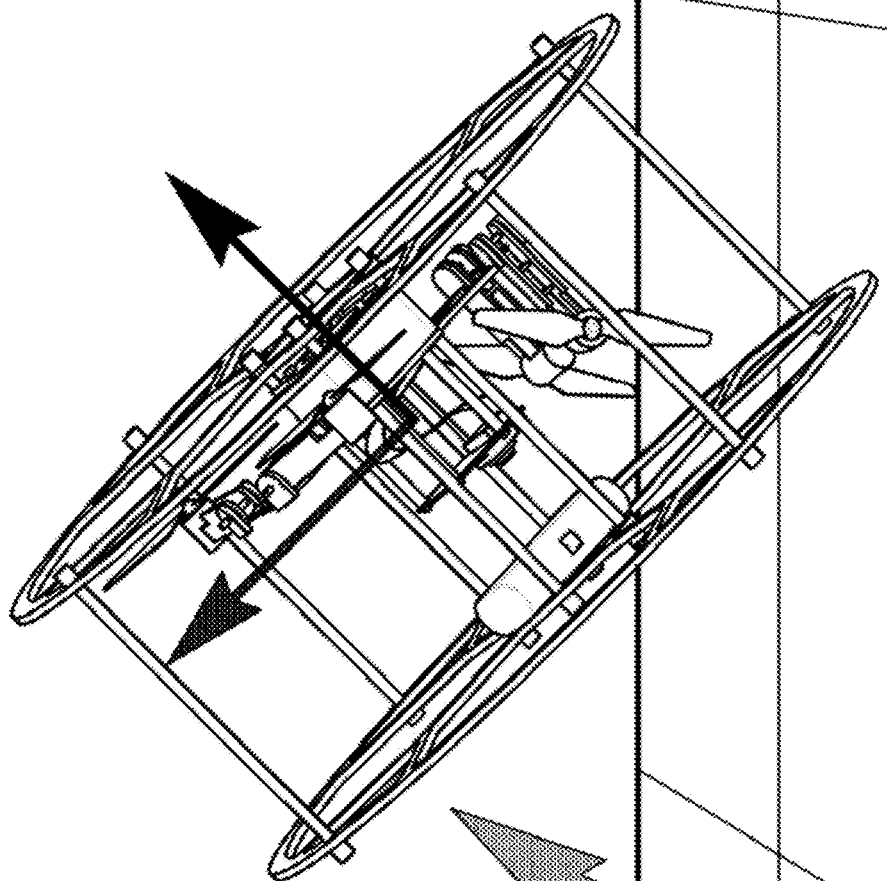
FIG. 8b is a photo of the prototype quadrotor showing the transition from the flight mode to the rolling mode, at t=1 s.
Figure 8C:
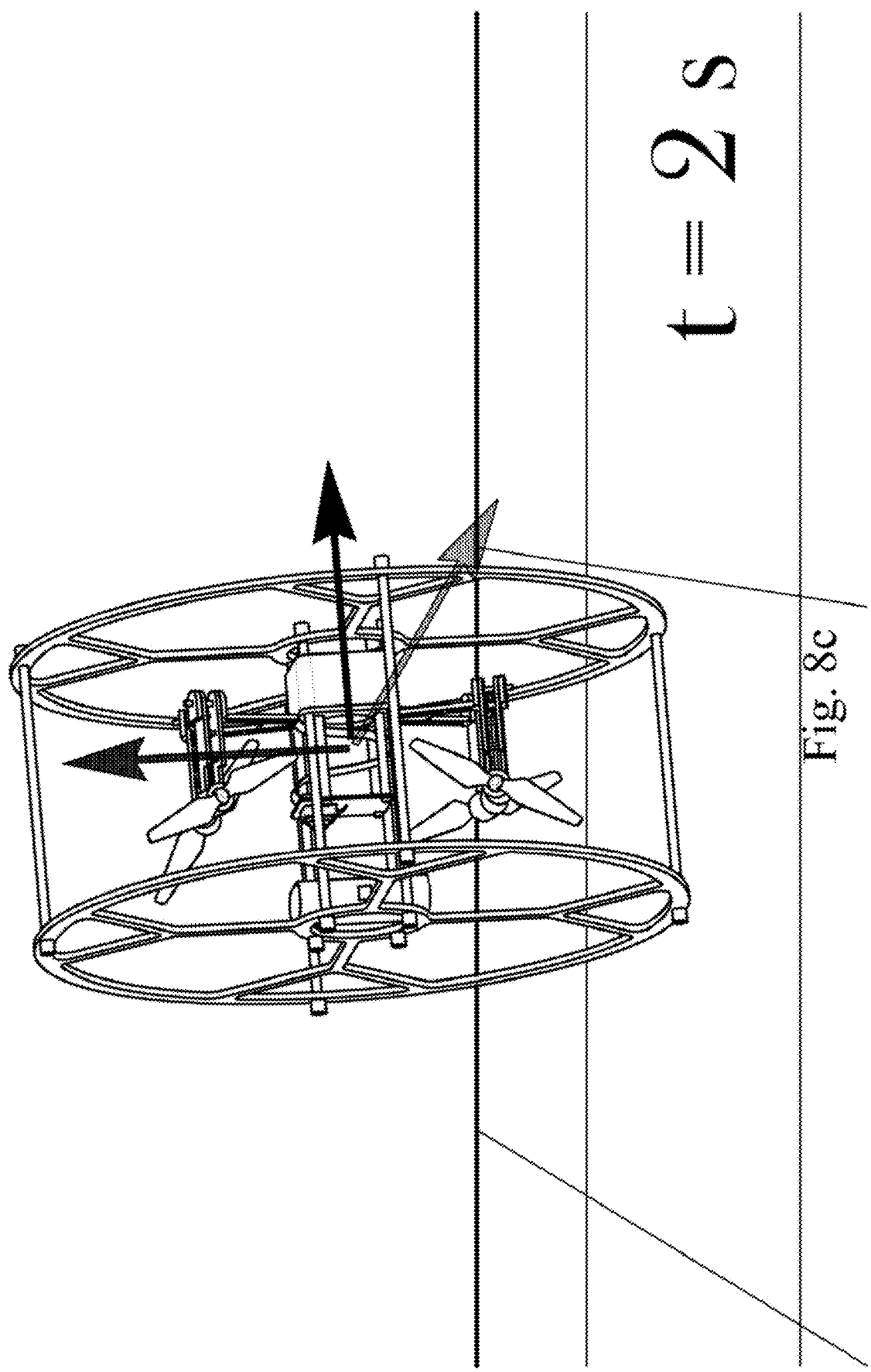
FIG. 8c is a photo of the prototype quadrotor showing the transition from the flight mode to the rolling mode, at t=2 s.

Next, it will be shown that the transitioning method developed in for the previous generation smaller robot with two passive joints remains effective for the robot in this work. To do so, the transition angle is defined as the angle between the $Z_B$ axis and the vector normal to the ground. By controlling the thrust of suitable propellers, the robot used the edge of the bottom wheel in contact with the ground as a non-slip hinge to transition the transition angle from 0° to 90°, ending in the rolling configuration as depicted in FIGS. 8a-8c. The maneuver was completed within 2.7 s as plotted in FIG. 7b.

Figure 8E:
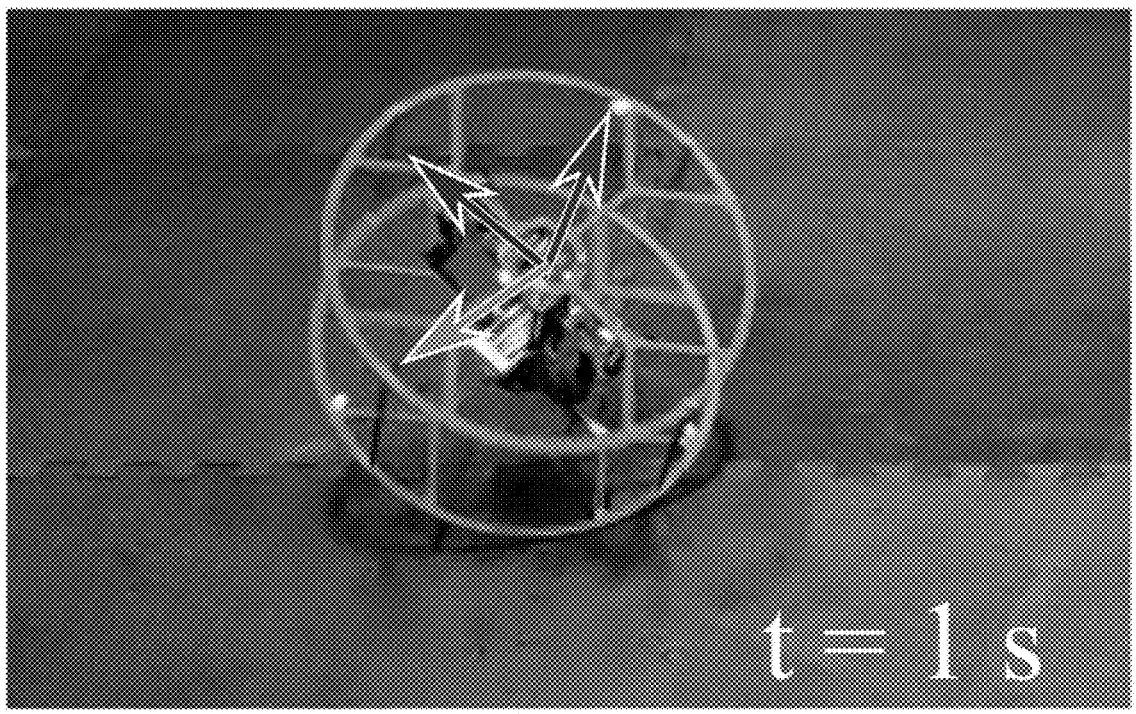
FIG. 8e is a photo of the prototype quadrotor showing the transition from the rolling mode to the flighting configuration, at t=1 s.
Figure 8F:
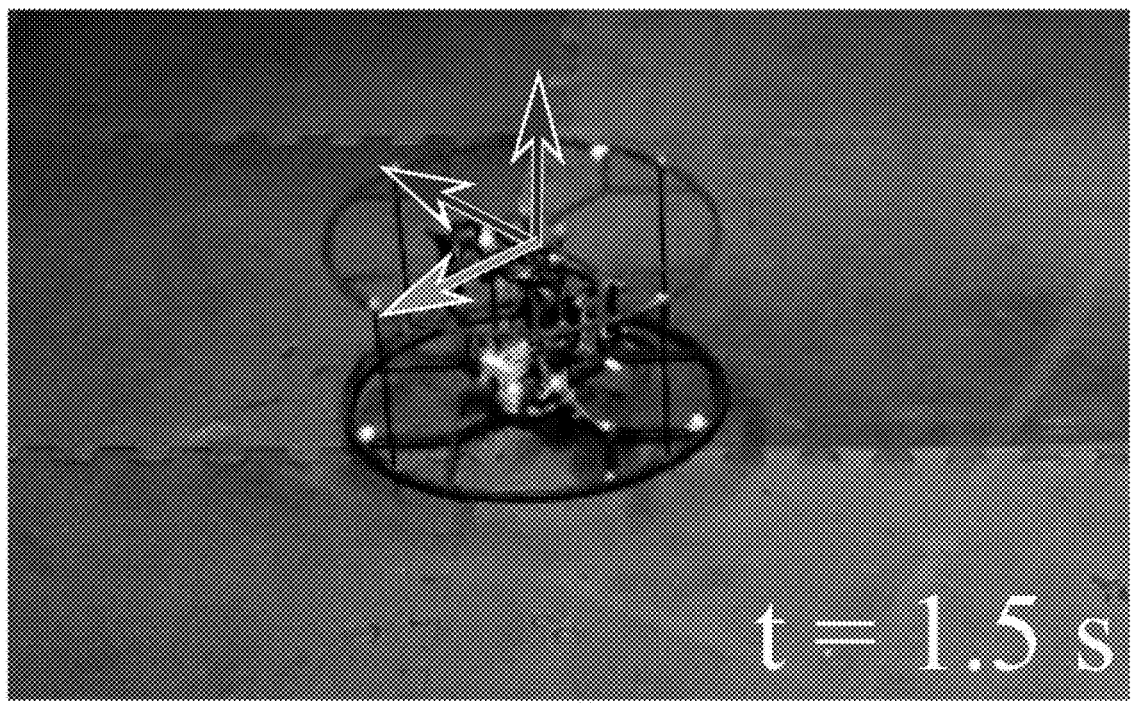
FIG. 8f is a photo of the prototype quadrotor showing the transition from the rolling mode to the flighting configuration, at t=1.5 s.

To make the transition back, the robot was controlled to roll at a constant rate. While rolling, one free propeller was actuated and unfolded. This immediately added the vertical component (as seen in the inertial frame) to the existing horizontal angular velocity vector. The resultant angular velocity made the robot fell into the flight mode (FIGS. 8d-8f). The transition angle dropped from 90° to 0° in about 2 s as shown in FIG. 7b.

Figure 7C:
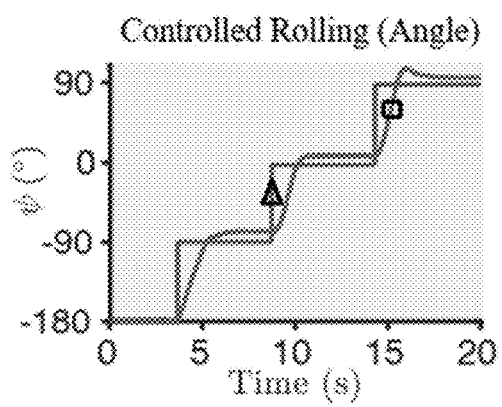
FIG. 7c shows reference results and experimental results of controlled rolling with step angular setpoints.
Figure 8G:
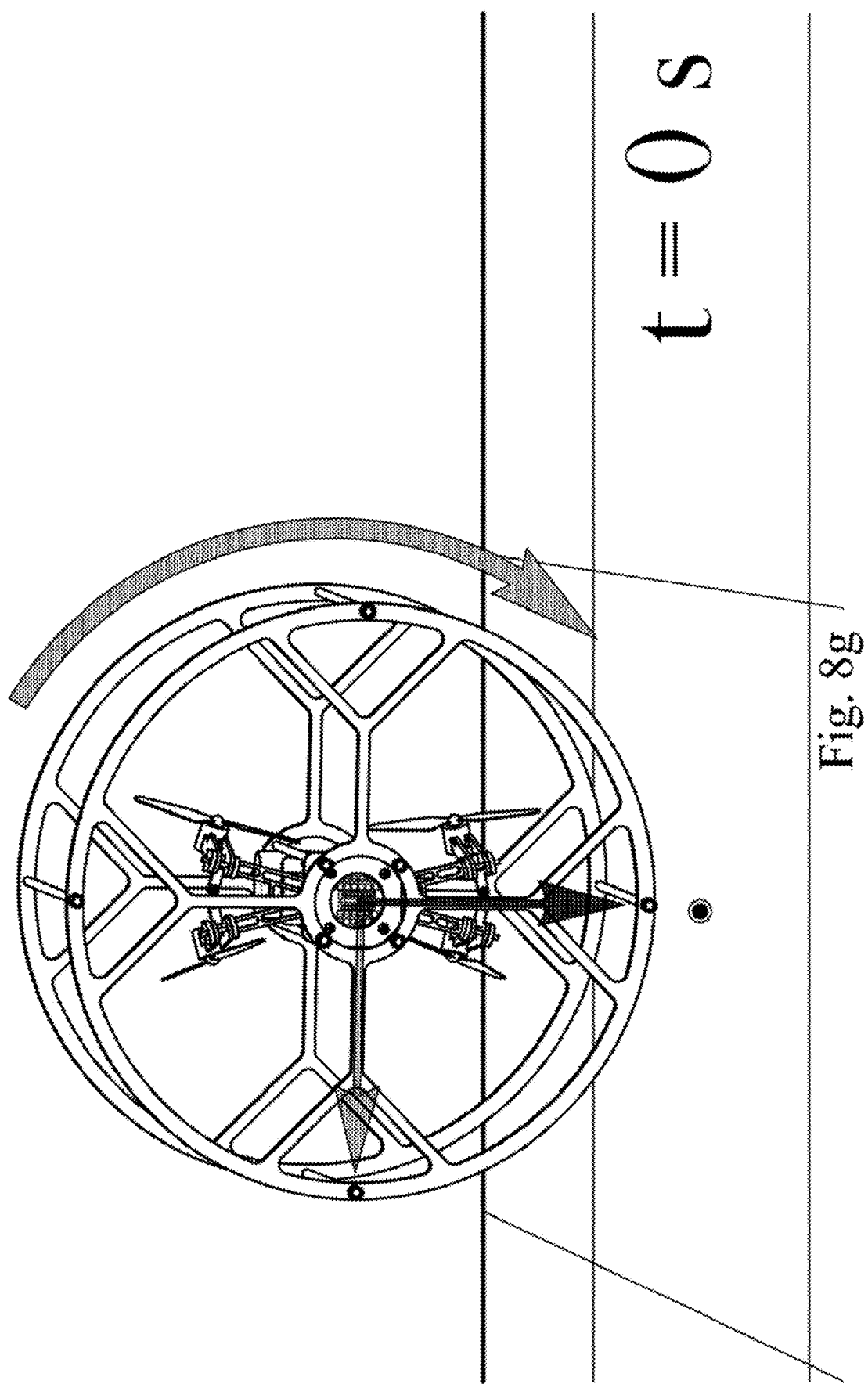
FIG. 8g is a photo of the prototype quadrotor showing its controlling rolling as a result of the change of the angular setpoint with 90° steps, at t=0 s.
Figure 8H:
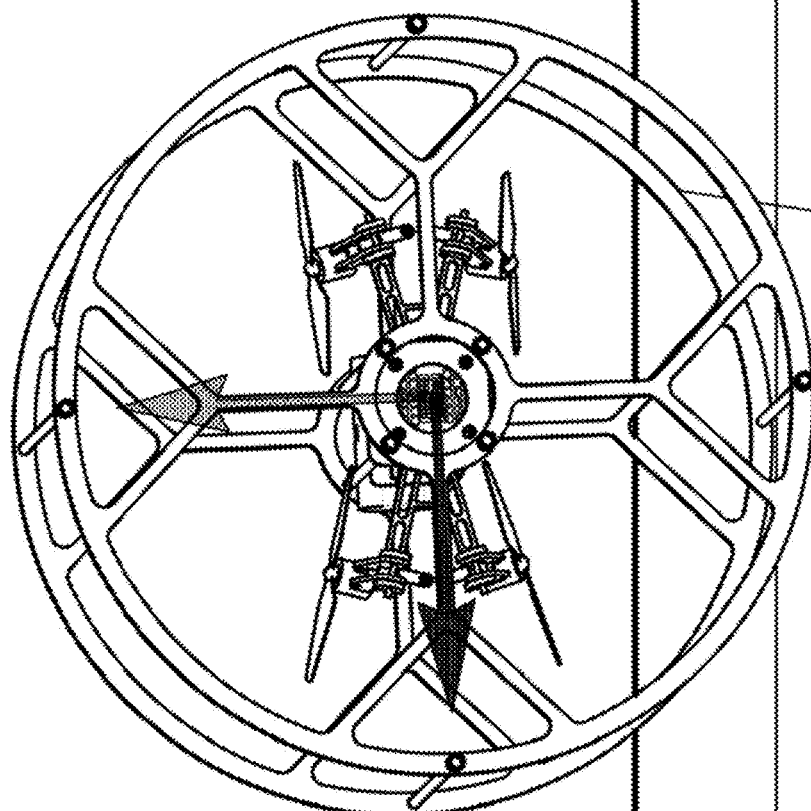
FIG. 8h is a photo of the prototype quadrotor showing its controlling rolling as a result of the change of the angular setpoint with 90° steps, at t=2 s.
Figure 8I:
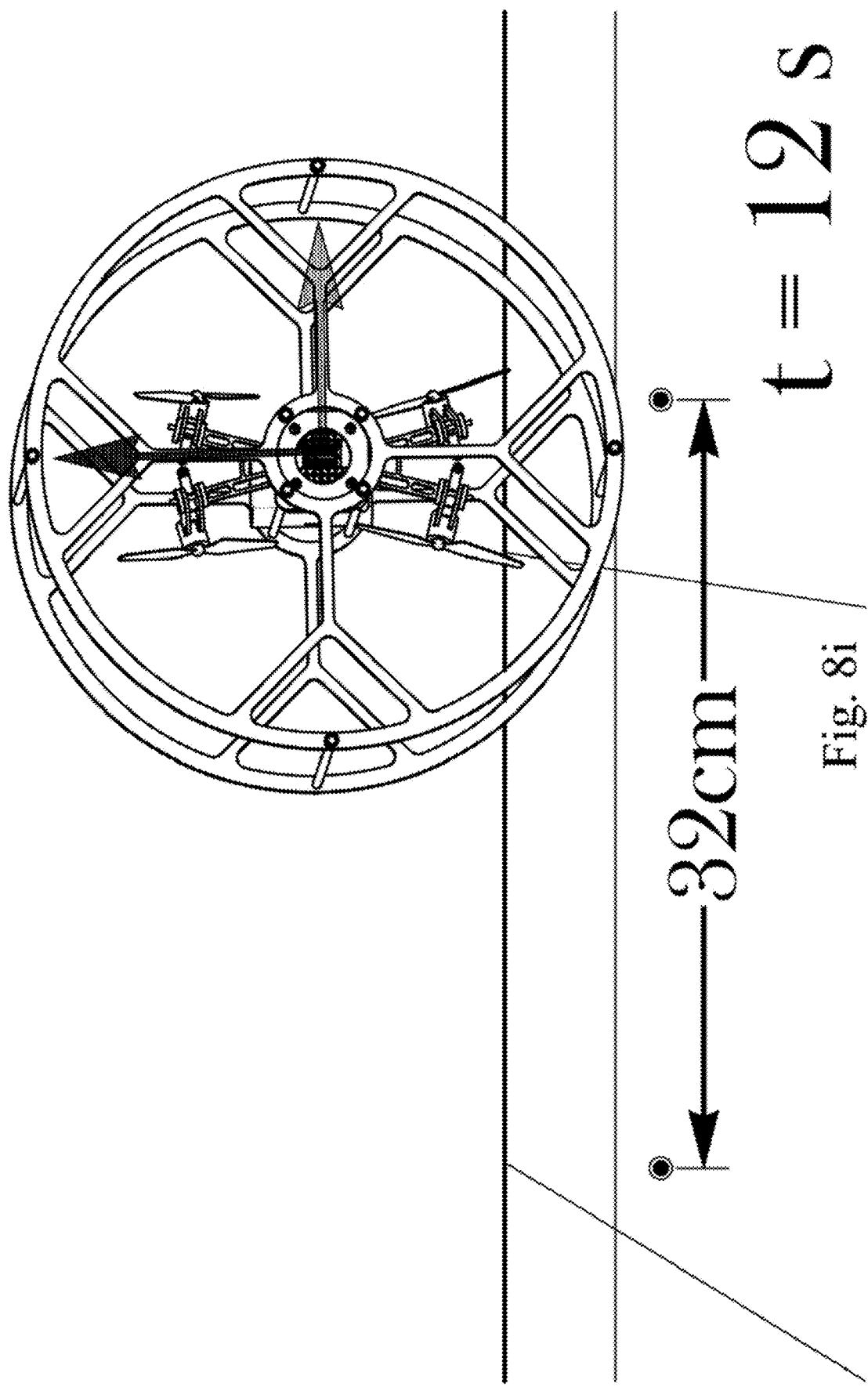
FIG. 8i is a photo of the prototype quadrotor showing its controlling rolling as a result of the change of the angular setpoint with 90° steps, at t=12 s.
Figure 8J:
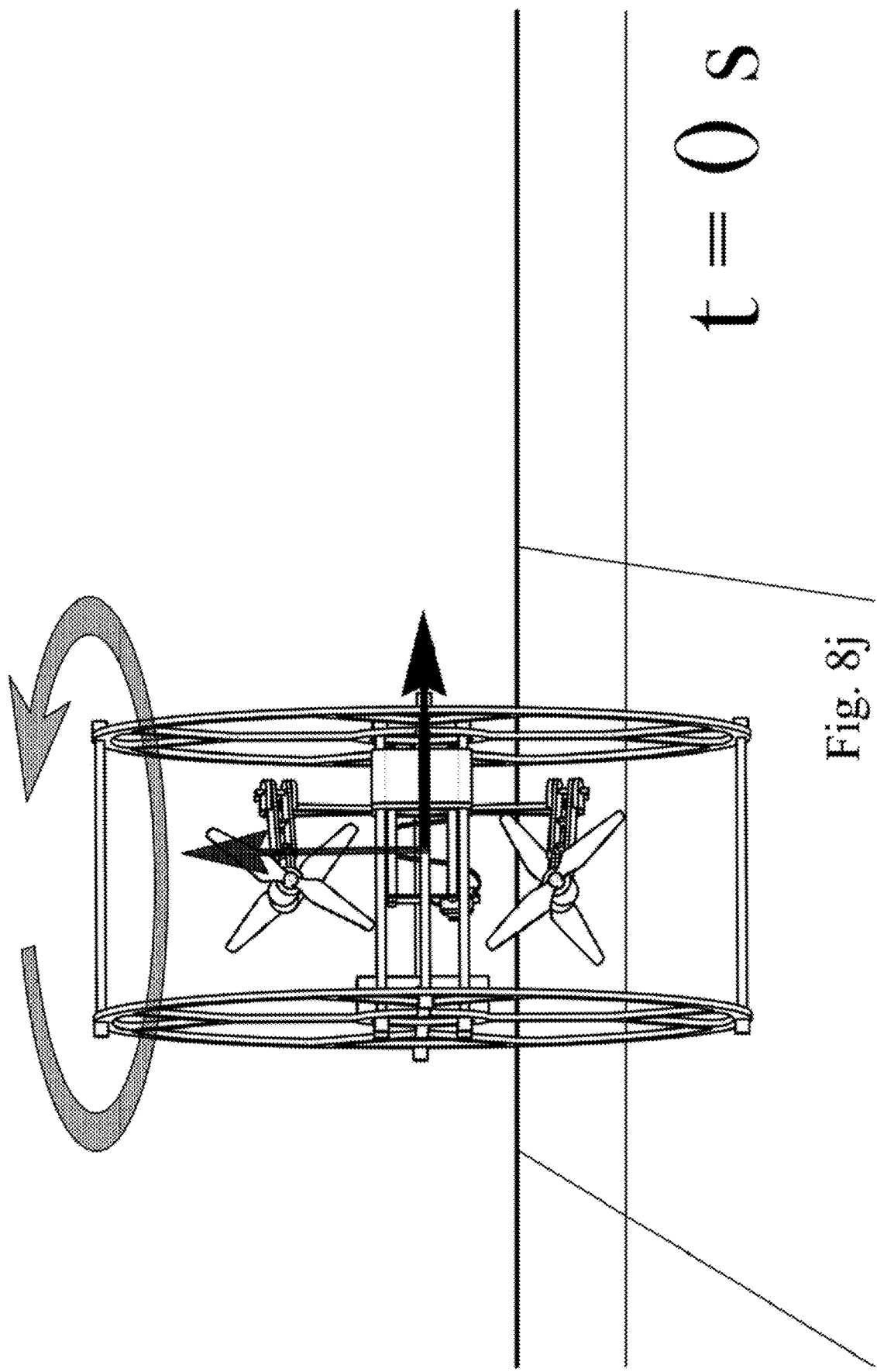
FIG. 8j is a photo of the prototype quadrotor showing it doing a 90° turn, at t=0 s.
Figure 8K:
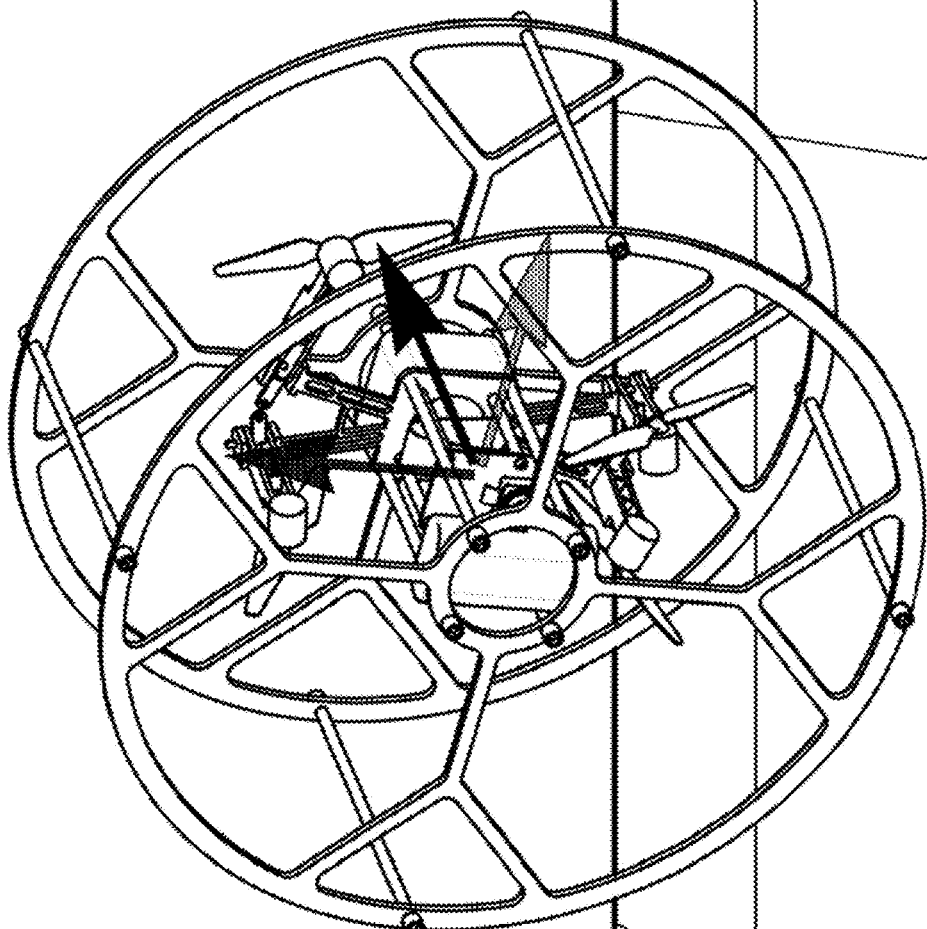
FIG. 8k is a photo of the prototype quadrotor showing it doing the 90° turn, at t=1 s.

The robot's terrestrial locomotion is validated by extensively examining its rolling and turning maneuvers using the controllers previously. In these tests, only the onboard feedback was required. To begin, the robot was commanded to track five reference yaw angles in 90° steps, completing one cycle of rotation as seen in FIGS. 8g-gi. With the step changes, the robot took approximately 1.6 s to deal with each sudden change in the reference as shown in FIG. 7c. Despite the non-negligible response time, the RMSE in rolling angle over the 20-s period is 32.3° with small averaged steady error) (6.0°. The result illustrates the robot's ability to accelerate and decelerate in the rolling mode despite the absence of additional actuators. In comparison, the controlled rolling was infeasible in the previous prototype in [24]. The precise angular control was also difficult to achieve and not demonstrated by the hybrid quadrotors in [21], [26].

Figure 7D:
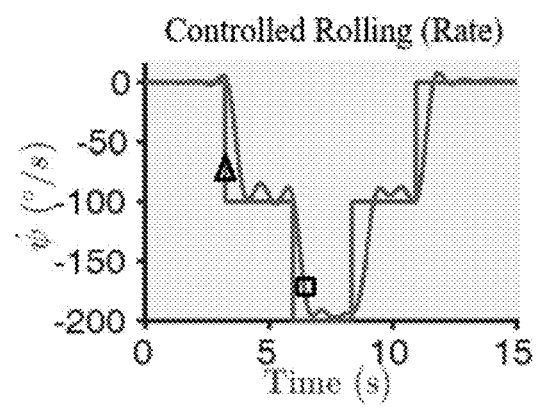
FIG. 7d shows reference results and experimental results of controlled rolling with rate setpoints.

FIG. 7d displays the result when robot was commanded to rolling at specified rates. The setpoint rates were −100 and −200 deg/s (corresponding to v=0.56 m/s). The robot took about 1 s to react to the step changes. The RMSE over the 15 s trajectory is 25.4 deg/s, with the averaged steady error of 6.8 deg/s. The effectiveness of the simple controller is a consequence of the robot's rolling configuration.

Figure 7E:
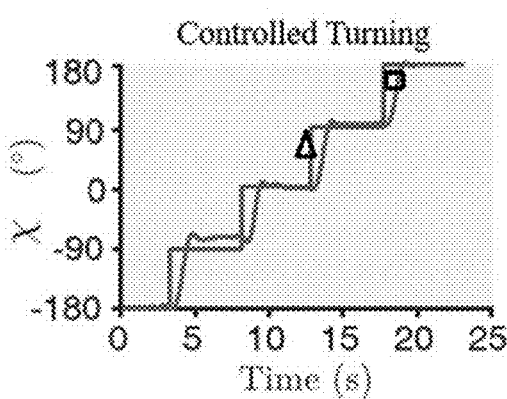
FIG. 7e shows reference results and experimental results of controlled turning.

To demonstrate controlled turns based on the strategy discussed above, the robot is firstly commanded to maintain a constant yaw angle of 0°. Then, the turns were made by adjusting the setpoints with the increment of 90° from −180° to 180° as captured by FIGS. 7e and 8j-8l. Again, the robot needed approximately 2 s to complete each turn. This results in the RMSE of 28.8° over the 20-s period seen in FIG. 7e. Despite the non-negligible response time, the steady angular errors 20) after each turn were only ≈5°.

Figure 7F:
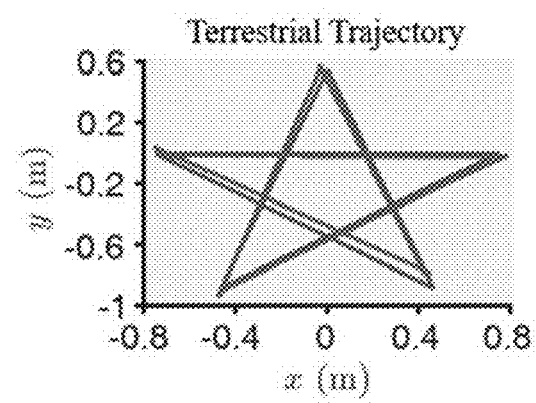
FIG. 7f shows reference results and experimental results of Pentagram trajectory.

Next, it will be shown that a relatively sophisticated trajectory can be realized using the onboard IMU feedback by sequentially controlling the robot's rolling rate and turns. As a demonstration, a pentagram-shaped path consisting of five 1.5-m straight-line segments and 144° turns is chosen. In this test, the commands of the rolling rates and turning directions were remotely transmitted to the robot by a human operator. Similar to the previous tests, the robot came to a complete stop prior to making a turn. The resultant trajectory, compared to the reference is presented in FIG. 7f. The robot completed the 7.5-m trajectory in 48 s.

Figure 9A:
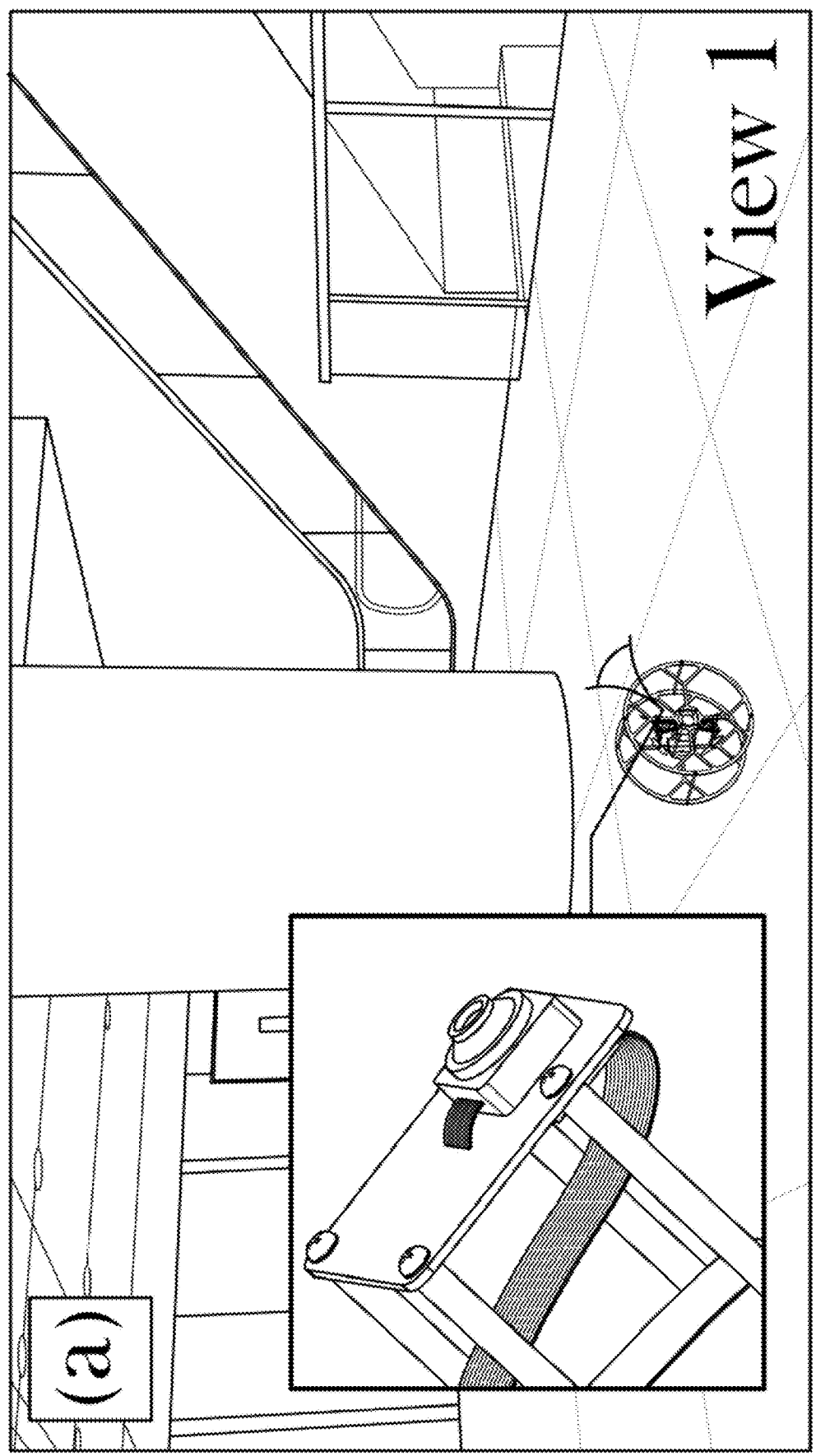
FIG. 9a illustrates the robot with an onboard camera photographing the interior of a building.
Figure 9B:
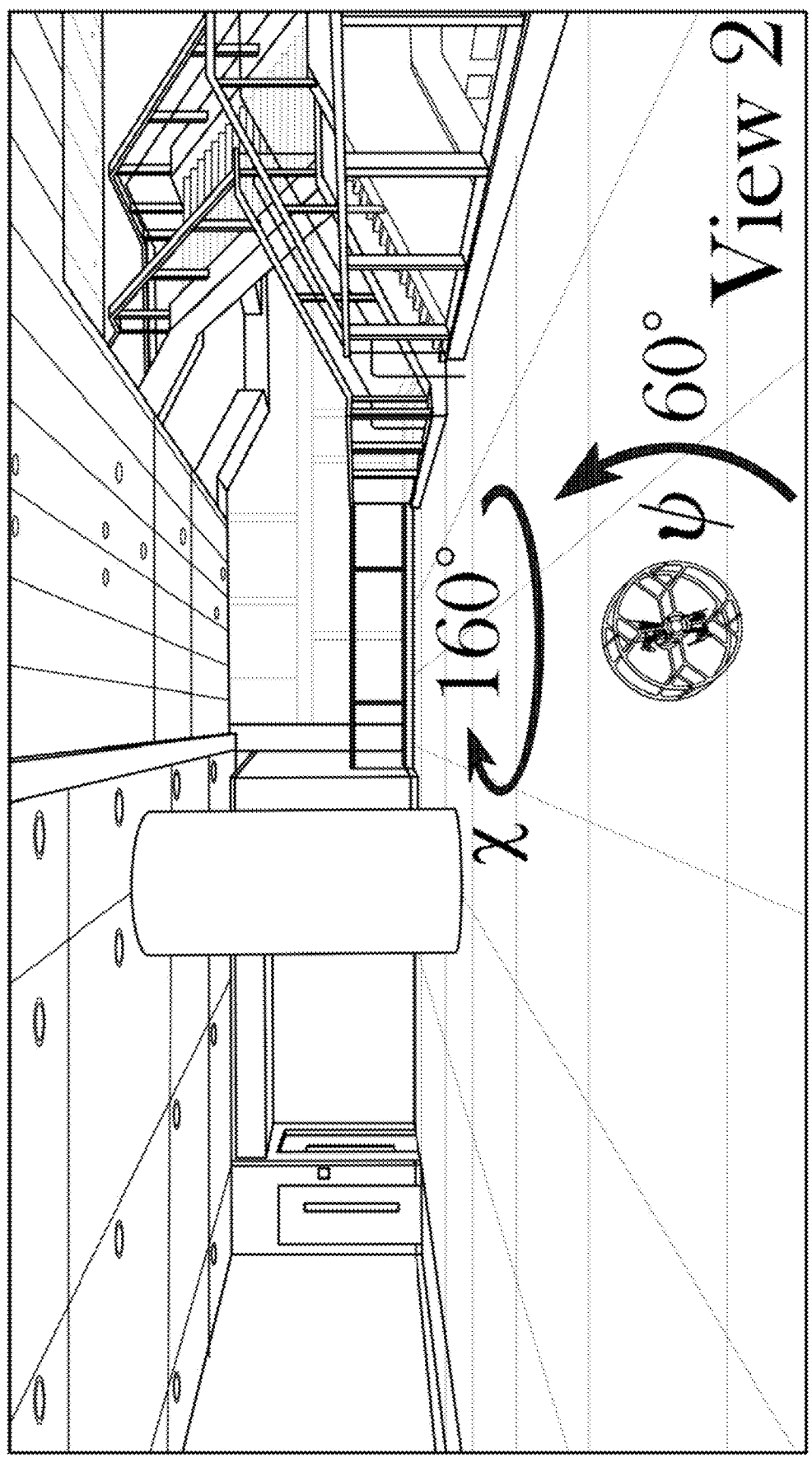
FIG. 9b shows the photograph of the interior of the building, in a different view.
Figure 9C:
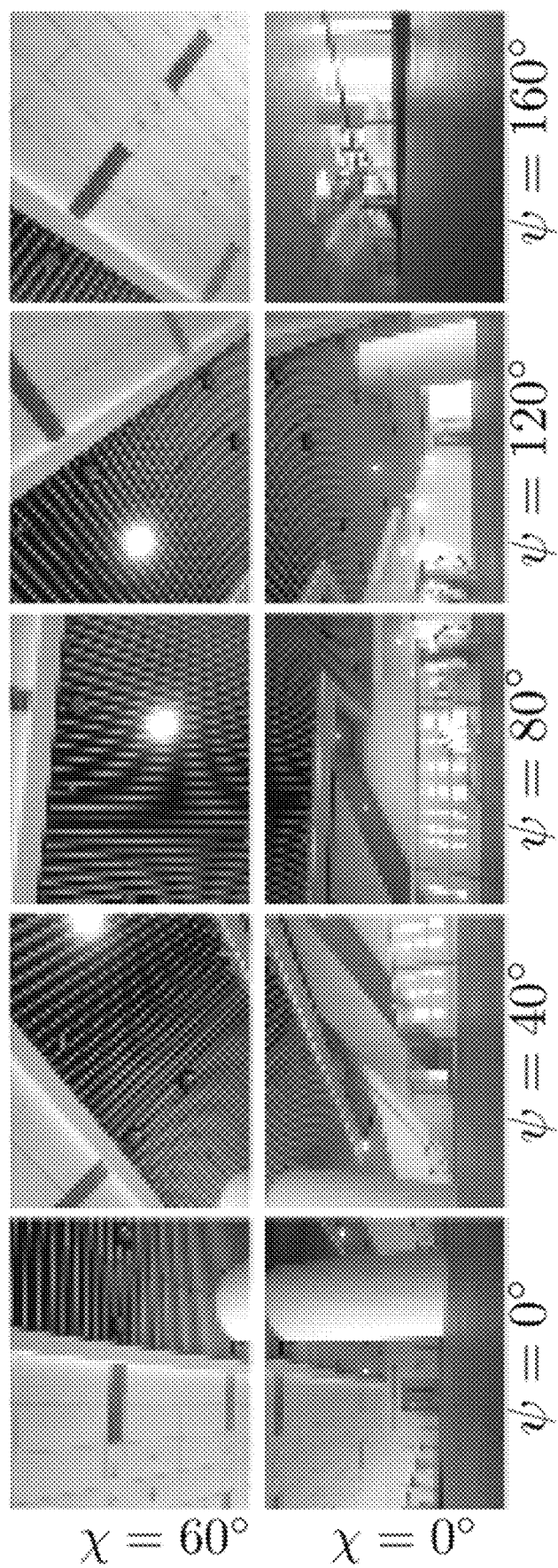
FIG. 9c are images taken by the onboard camera. The photos were from different camera panning $\psi$ and tilting $\chi$ angles (10 out of 36 photos shown).
Figure 9D:
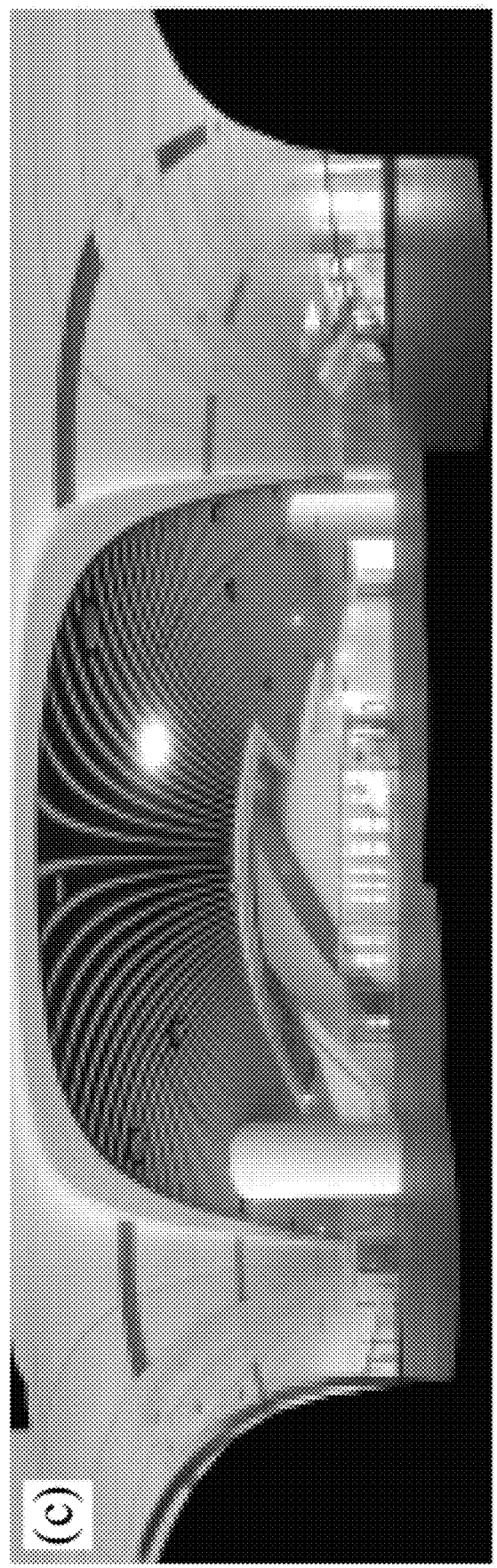
FIG. 9d is a panoramic image generated by stitching 36 images together.

Precise control in the terrestrial mode for the robot is used to take photos at various angles to construct one large panoramic image. A lightweight onboard camera (ArduCam 64 MP with 84° FoV) was installed on the robot such that the optical axis points radially outwards from the center of the rolling frame, such that it is not always frontal (FIGS. 9a-9b). The robot took 36 photos of the surrounding, covering nine turning (camera panning) angular $\chi_d$ setpoints (20° apart) and four rolling (camera tilting) $\psi_d$ angular setpoints (20° apart), by briefly staying stationary at each configuration to trigger the camera for non-blurry images (10 out of 36 images shown in FIG. 9c). As presented in FIG. 9d, after stitching by open-source software [32], a clear panoramic photo is generated.

Overall, these results show that the relatively simple methods for controlled rolling and turning are highly effective, attributable to the reconfigurable design of the airframe.

Next, the power consumption and cost of transport of the quadrotor will be investigated. For comparison, the baseline power of the electronics without actuation is determined for 10 minutes. The average power in the resting state was found to be 1.5 W. To measure the power of the robot when rolling, the robot was set to travel back and forth along a 10-m line on three ground surfaces (vinyl flooring, brick tiles, and artificial turf). This was accomplished by switching the yaw rate setpoint between positive and negative values. This means the tests include periods of acceleration and deceleration. Three speeds were trialed: 0.5, 1.0, and 1.5 ms$^{-1}$ on each surface. For each speed, the test lasted over four minutes. The averaged powers are plotted in FIG. 7g, monotonically increasing with the rolling speed.

Figure 7G:
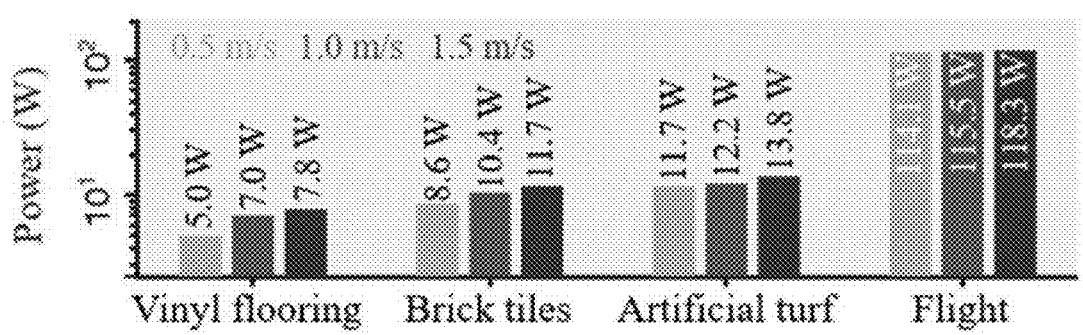
FIG. 7g shows experimental results of power consumption of the robot at three traveling speeds.
Figure 7H:
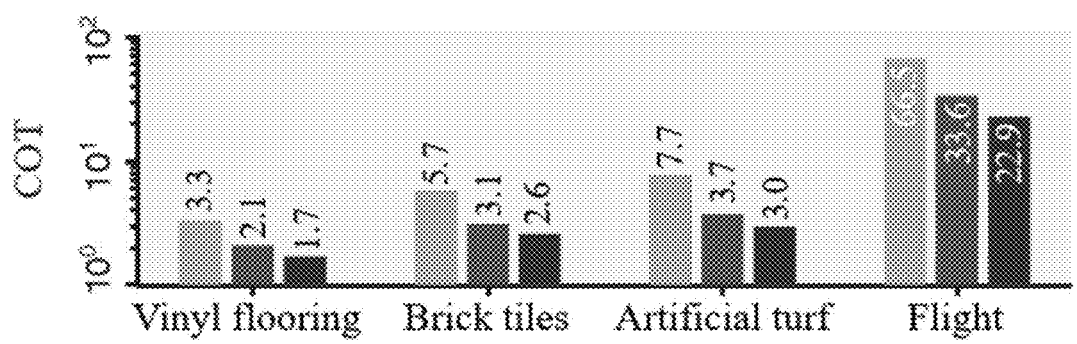
FIG. 7h shows experimental results of cost of transport.

A similar test was repeated with the robot flying. Since the robot expended considerably more energy in flight, we only flew the robot for one minute for each speed. At these speeds, the differences in the average power consumption are insignificant as seen in FIG. 7g. This is because the energy required to stay aloft is much higher than the power spent to overcome the aerodynamic drag at low flight speeds. Flying consumes ≈10-20 times more energy than rolling.

Taking into account the speeds, the dimensionless COT is calculated and shown in FIG. 7g. That is, rolling is up to ≈15 times as efficient as flying at these low speeds. The ratio of up to 15 in this work is higher than 3 demonstrated by a crawling-flying mini quadrotor or ≈10 previously achieved by rolling quadrotors in [21], [26], likely due to the distinct propulsion mechanism for rolling of the proposed robot as discussed above. When the terrain allows, terrestrial locomotion becomes a highly appealing strategy for the robot to travel significantly further.

One can see that the exemplary embodiments discussed above provide a rotorcraft capable of controlled rolling and turning with a low cost of transport when traveling at low speeds. Unlike conventional designs, the bimodal locomotion herein is enabled by a passively deformable airframe and a rolling cage. The use of revolute joints permits the thrust vectors to be re-oriented according to the control demands. In this form, the robot (i) rolls more efficiently; (ii) is able to directly accelerate/decelerate and control the turning and rolling motions, and (iii) takes a narrower profile while rolling. The performance of the robot in the aerial and terrestrial phases, as well as the transitions, was verified by a series of experiments. An example use of precise control in the terrestrial mode for a visual surveying task was presented. Furthermore, the power consumption of rolling was up to 15 times as low as that of flying. The degree of power saving compares favorably to previous hybrid quadrotors.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, the outframe (i.e., the rolling structure) of the quadrotor as shown in FIGS. 1a-2b contains two hollow wheels connected to the body of the robot by spokes. However, one skilled in the art would realize that other types of rolling structure is also applicable to the invention for example solid wheels, or a drum-shaped rolling structure.

In addition, quadrotors are used as examples of unmanned aerial vehicles for describing embodiments of the invention above. Nonetheless, the number of propellers in the UAV is not limited to four. There could be more propellers in the UAV (e.g., six or eight) to which the invention could also be applied to.

In the exemplary embodiments as mentioned above, a coil spring is used as the elastic component for the passive joints. However, those skilled in the art should realize that the invention is not limited to the use of coil spring, but any other types of elastic components may also be used for constructing the passive joints.

The invention claimed is:

1. An unmanned aerial vehicle, comprising:
    a) a rolling structure adapted to roll on a surface;
    b) a body mounted within the rolling structure; and
    c) four propellers connected to the body;
    wherein the body is coupled to the four propellers by a passively reconfigurable module, such that the unmanned aerial vehicle is adapted to be switched between a flying state and a rolling state; the passively reconfigurable module comprising four passively reconfigurable joints; each said passively reconfigurable joint connecting a respective one of the four propellers to the body; and
    wherein in the rolling state, two of the four propellers are adapted to generate positive rolling torque and the other two of the four propellers are adapted to generate negative rolling torque.

2. The unmanned aerial vehicle of claim 1, wherein the body is connected non-rotatably to the rolling structure.

3. The unmanned aerial vehicle of claim 2, wherein the rolling structure comprises two wheels; the wheels connected respectively to two opposite ends of the body.

4. The unmanned aerial vehicle of claim 1, wherein each said passively reconfigurable joint comprises:
   d) a propeller arm pivotally coupled to the body at a revolute point; and
   e) an elastic component with one end connected to or adjacent a free end of the propeller arm, and another end coupled to the body at a location away from the revolute point.

5. The unmanned aerial vehicle of claim 4, wherein the elastic component is a coil spring which is pre-stretched, such that the unmanned aerial vehicle is in the rolling state when the propellers are not energized.

6. The unmanned aerial vehicle of claim 5, wherein the coil spring is substantially parallel to the propeller arm when the unmanned aerial vehicle is in the flying state.

7. The unmanned aerial vehicle of claim 5, wherein the coil spring and the propeller arm form two sides of a virtual triangle when the unmanned aerial vehicle is in the rolling state;
   the revolute point located at a vertex of the triangle.

8. The unmanned aerial vehicle of claim 1, wherein the four propellers are substantially aligned in a same plane when the unmanned aerial vehicle is in the flying state.

9. The unmanned aerial vehicle of claim 1, wherein the four propellers consist of a first pair of the propellers and a second pair of the propellers; within each pair the two propellers are arranged oppositely such that they are in a substantially back-to-back configuration, when the unmanned aerial vehicle is in the rolling state; wherein propelling axes of the four propellers are substantially orthogonal to a rolling axis of the unmanned aerial vehicle in the rolling state.

10. The unmanned aerial vehicle of claim 4, wherein each said passively reconfigurable joint further comprises a stopper coupled to the propeller arm; the stopper adapted to be urged against the body to prevent the propeller arm from moving beyond an angular limit.

11. The unmanned aerial vehicle of claim 3, wherein a spanned area of the body and the four propellers, when the unmanned aerial vehicle is in the flying state, is smaller than an area defined by one said wheel.

12. The unmanned aerial vehicle of claim 1, wherein the unmanned aerial vehicle switches from the rolling state to the flying state when generated thrusts by the propellers are greater than a predetermined threshold.

13. The unmanned aerial vehicle of claim 4, wherein the propeller arm is connected to an end of an extension arm extending from the body; said another end of the elastic component connected to the extension arm at the location away from the revolute point.

14. The unmanned aerial vehicle of claim 13, wherein the extension arm is fixedly connected to the body.

* * * * *